United States Patent
Vaishnav et al.

(10) Patent No.: US 10,846,204 B2
(45) Date of Patent: Nov. 24, 2020

(54) REMEDIATION OF DESIGN TIME AND RUNTIME WORKFLOW ERRORS

(71) Applicant: Microsoft Technology Licensing, LLC, Redmond, WA (US)

(72) Inventors: Sunay Vaishnav, Seattle, WA (US); Anjli Chaudhry, Seattle, WA (US); Prabir K. Shrestha, Redmond, WA (US); FNU Anubhav, Redmond, WA (US); Khetthai Laksanakorn, Redmond, WA (US); Stephen Siciliano, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/989,096

(22) Filed: May 24, 2018

(65) Prior Publication Data
US 2019/0324893 A1    Oct. 24, 2019

Related U.S. Application Data

(60) Provisional application No. 62/660,803, filed on Apr. 20, 2018.

(51) Int. Cl.
*G06F 9/44*     (2018.01)
*G06F 9/45*     (2006.01)
(Continued)

(52) U.S. Cl.
CPC ...... *G06F 11/3664* (2013.01); *G06F 11/3608* (2013.01); *G06N 20/00* (2019.01)

(58) Field of Classification Search
CPC .... G06F 11/3664; G06F 11/3608; G06F 8/20; G06N 20/00
See application file for complete search history.

(56) References Cited

U.S. PATENT DOCUMENTS 9,916,133 B2 *   3/2018   Jubran ................. G06F 8/00
10,127,149 B2 *  11/2018  Sivasubramanian ... G06F 12/02
(Continued)

OTHER PUBLICATIONS

Tomas Kren, Multi-Objective Evolution of Machine Learning Workflows, 2017, pp. 1-6. https://ieeexplore.ieee.org/stamp/stamp.jsp?tp=&arnumber=8285357 (Year: 2017).*
(Continued)

*Primary Examiner* — Mongbao Nguyen
(74) *Attorney, Agent, or Firm* — Fiala & Weaver P.L.L.C.

(57) ABSTRACT

Methods, systems, apparatuses, and computer program products are provided for remedying design time and runtime workflow errors. During design time of a workflow, an input parameter provided via the user interface may be validated to determine if the parameter is invalid. Based on the determination, a replacement parameter may be obtained and provided to the user interface control of the workflow user interface to replace the invalid workflow parameter during development of the workflow. During runtime of a workflow, a workflow engine may generate failure information where workflow logic fails to execute successfully. The failure information generated in response to a runtime failure is received by a remediation system and may be analyzed to identify a probable cause of the runtime failure. Remediation instructions to remediate the runtime failure may be determined and transmitted to a contact address associated with the workflow, enabling the workflow to be repaired.

20 Claims, 11 Drawing Sheets

(51) Int. Cl.
*G06F 9/445* (2018.01)
*G06F 11/36* (2006.01)
*G06N 20/00* (2019.01)

(56) References Cited

U.S. PATENT DOCUMENTS

| | | | | |
|---|---|---|---|---|
| 10,324,783 | B1* | 6/2019 | Saha | G06F 11/079 |
| 2006/0048094 | A1* | 3/2006 | Kipman | G06Q 10/06 |
| | | | | 717/104 |
| 2006/0200797 | A1* | 9/2006 | Grasselt | G06Q 10/06 |
| | | | | 717/107 |
| 2010/0251092 | A1* | 9/2010 | Sun | G06F 40/174 |
| | | | | 715/222 |
| 2010/0251155 | A1* | 9/2010 | Shah | G06F 8/34 |
| | | | | 715/771 |
| 2010/0280865 | A1* | 11/2010 | Goja | G06Q 10/06 |
| | | | | 705/7.27 |
| 2011/0246991 | A1* | 10/2011 | Lu | G06Q 10/06 |
| | | | | 718/100 |
| 2011/0276915 | A1* | 11/2011 | Freire | G06Q 10/00 |
| | | | | 715/772 |
| 2012/0291012 | A1* | 11/2012 | Robison | G06F 8/30 |
| | | | | 717/120 |
| 2013/0152038 | A1* | 6/2013 | Lim | G06Q 10/103 |
| | | | | 717/101 |
| 2014/0172371 | A1* | 6/2014 | Zhu | G06F 11/0709 |
| | | | | 702/185 |
| 2014/0282353 | A1* | 9/2014 | Jubran | G06F 8/00 |
| | | | | 717/101 |
| 2015/0046389 | A1* | 2/2015 | Dhayapule | G06F 11/079 |
| | | | | 707/602 |
| 2016/0274995 | A1* | 9/2016 | Klein | G06F 11/3608 |
| 2017/0083290 | A1* | 3/2017 | Bharthulwar | G06F 11/3688 |
| 2017/0300701 | A1* | 10/2017 | Ponta | G06F 21/6218 |
| 2018/0081784 | A1* | 3/2018 | Rivera | G06F 11/3624 |
| 2018/0210815 | A1* | 7/2018 | Chau | G06F 8/433 |
| 2018/0217891 | A1* | 8/2018 | Kakaraparthi | G06F 11/0781 |
| 2018/0324051 | A1* | 11/2018 | Dias | G06Q 10/0631 |
| 2019/0005018 | A1* | 1/2019 | Sharma | G06F 16/3329 |
| 2019/0163447 | A1* | 5/2019 | Carey | G06F 8/30 |
| 2020/0034281 | A1* | 1/2020 | Hamid | G06N 20/00 |
| 2020/0065136 | A1* | 2/2020 | Singh | G06F 16/211 |

OTHER PUBLICATIONS

Javier Rojas Balderrama, GinFlow: A Decentralised Adaptive Workflow Execution Manager, 2016, pp. 923-932. https://ieeexplore.ieee.org/stamp/stamp.jsp?tp=&arnumber=7516089 (Year: 2016).*

Microsoft, Invoking Activity Validation, 2017, pp. 1-10. https://docs.microsoft.com/en-us/dotnet/framework/windows-workflow-foundation/invoking-activity-validation (Year: 2017).*

M. Jafar Taghiyar, Kronos: a workflow assembler for genome analytics and informatics, 2017, pp. 1-10. https://www.ncbi.nlm.nih.gov/pmc/articles/PMC5569921/pdf/gix042.pdf (Year: 2017).*

Matt Milner, Foundations—Error Handling in Workflows, 2009, pp. 1-14. https://docs.microsoft.com/en-us/archive/msdn-magazine/2009/february/foundations-error-handling-in-workflows (Year: 2009).*

Ling Lin, Design and Implementation of the Automatic Generation workflow System, 2014, pp. 1-6. https://ieeexplore.ieee.org/stamp/stamp.jsp?tp=&arnumber=6997656&isnumber=6997624 (Year: 2014).*

Visual Studio, "Activity Validation Logic Overview", retrieved from <https://msdn.microsoft.com/en-us/library/ms734773(v=vs.90).aspx> on Jun. 13, 2018, 3 pages.

Integration Team, "Exception Handling in Logic Apps", retrieved from <http://integration.team/2017/04/08/exception-handling-logic-apps/>, Published on Apr. 8, 2017, 17 pages.

Sun, Sherry Xiaoyun, "Dataflow Analysis and Workflow Design in Business Process Management", retrieved from <http://hdl.handle.net/10150/194901>, 2007, 139 pages.

Visual Studio, "Perform Quick Actions with Light Bulbs", retrieved from <https://msdn.microsoft.com/en-us/library/dn872466.aspx> on Jun. 13, 2018, 2 pages.

Microsoft, "Set Name AutoCorrect Options", retrieved from <https://support.office.com/en-us/article/Set-name-AutoCorrect-options-981B70EF-56EA-47A8-8BB4-A93C10A9D98B> on Jun. 13, 2018, 7 pages.

* cited by examiner

REMEDIATION OF DESIGN TIME AND RUNTIME WORKFLOW ERRORS

CROSS-REFERENCE TO RELATED APPLICATIONS

This application claims priority to U.S. Provisional Patent Application No. 62/660,803, filed on Apr. 20, 2018, the entirety of which is incorporated by reference herein.

BACKGROUND

Some workflow automation tools enable the creation of workflows that perform work, such as the performance of services and/or processing of information. Workflow automation tools may enable non-professional developers (non-coders) to create the workflows. In particular, to create an executable workflow, a developer arranges and configures workflow steps in a workflow development tool, which generates executable workflow logic based thereon. As part of configuring the workflow steps, the developer typically inputs parameter values into workflow step controls, such as text entry boxes, that become part of the workflow logic and are relied upon during workflow execution at runtime. Non-professional developers, however, often struggle with providing or selecting the correct input parameters. When workflow logic has an incorrect parameter, the workflow may fail or yield unpredictable results at runtime.

Workflow automation tools typically have limited ability in validating user inputs to ensure that the workflow executes successfully. In one solution, a workflow engine may make runtime calls when workflow logic is executed to validate the user-provided inputs. Such a runtime call approach is limited to static inputs, does not extend to dynamic inputs that come from a previous step of the workflow or another workflow, and requires storage to be populated with data that matches the criteria as defined in the workflow logic to verify against the user-provided inputs. Additionally, such an approach requires increased processing resources at runtime and can lead to design time user errors caused by incorrect input parameters.

Furthermore, where a workflow logic fails to execute successfully during runtime, error codes or messages associated with the workflow are often difficult to understand for the workflow developer. For example, raw error messages generated by a workflow platform are often unclear, verbose, and/or otherwise unintelligible to a non-professional developer. As a result of this difficulty, the developer may struggle to determine what corrective steps are necessary to ensure a successful run. In many cases, this may result in the developer attempting to fix the workflow logic through inefficient or uncertain methods, such as by trial and error, leading to unnecessary workflow executions and inefficient utilization of system resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for validating a user-provided input during a design time of the workflow. In an implementation, the input parameter provided via a user interface may be validated to determine if the parameter is incorrect/invalid. Based on the determination, a replacement parameter may be obtained and automatically provided to the user interface control of the workflow user interface to replace the invalid workflow parameter. This enables the validation of user-provided inputs prior to execution of the workflow, and the automatically healing (correcting) of an incorrect user-provided input at design time to increase the likelihood that the generated workflow will execute correctly.

Methods, systems, apparatuses, and computer program products are also provided for determining workflow remediation instructions based on workflow runtime failures. In accordance with an implementation, failure information generated in response to a workflow logic runtime failure is received. The failure information may be analyzed to identify a probable cause of the runtime failure. Remediation instructions to remediate the probable cause of the runtime failure may thereby be determined and transmitted to a contact address associated with the workflow.

In this manner, workflow failures may be analyzed to determine one or more repair steps necessary to remedy the workflow logic to increase the likelihood of a successfully workflow execution. In addition, because workflow failure error codes or messages are typically difficult to parse in the context of a given workflow, transmission of the determined cause of failure in an understandable format to the contact address permits a developer to ascertain the reason for the failed execution.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
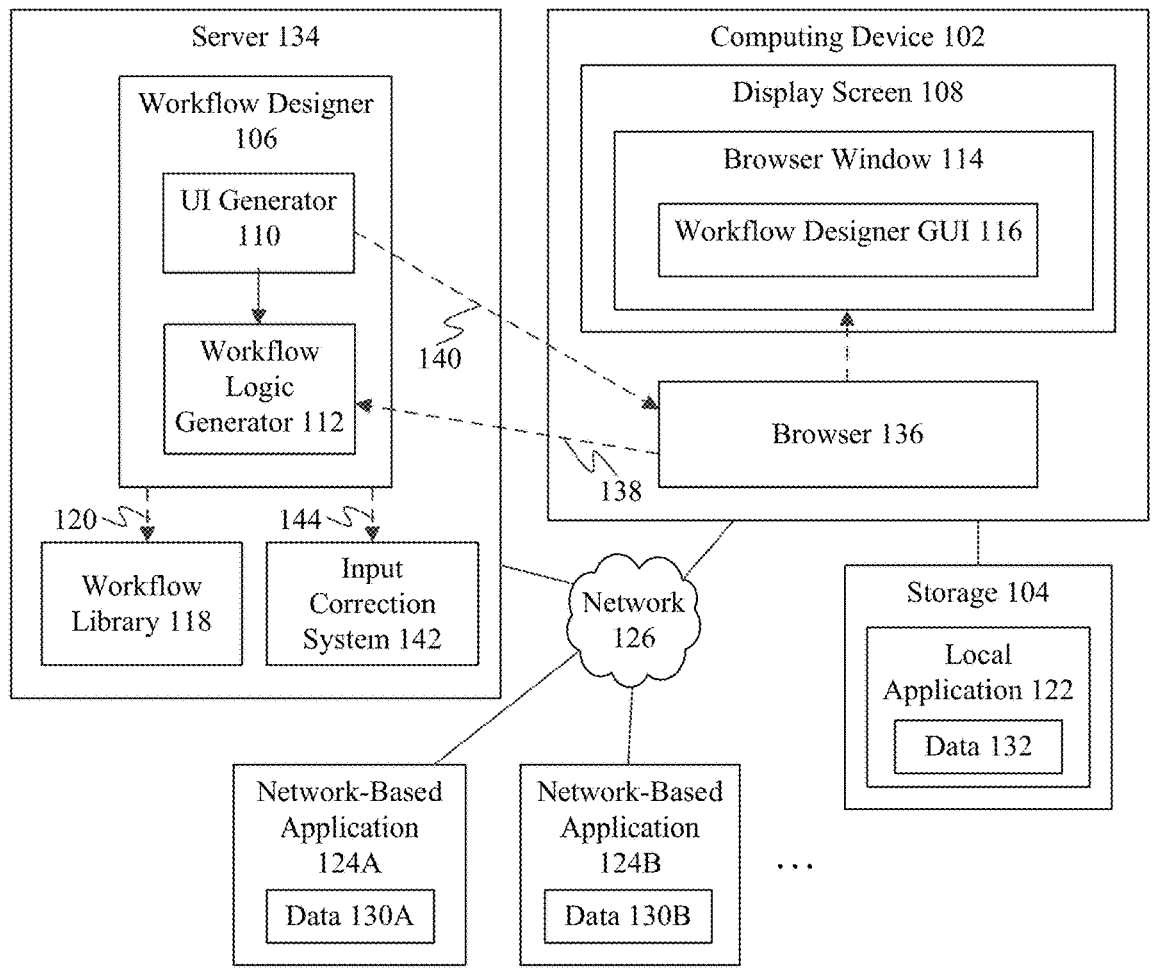
FIG. 1 shows a workflow development system configured to correct workflow inputs, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Development and Runtime of Workflows

As noted in the Background section above, to create an executable workflow, a developer, which may be a non-professional developer (a developer who does not have programming skills or experience), arranges and configures workflow steps in a workflow development/automation tool, which generates executable workflow logic based thereon. When creating a workflow, developers typically input parameter values into workflow step controls, such as text entry boxes, that become part of the workflow logic and are relied upon during workflow execution at runtime.

In creating a workflow definition of workflow logic based on a number of workflow steps, users (e.g., developers) may provide static and/or dynamic inputs. A user may provide a static input, for example, by directly typing in a parameter (e.g., a value), copy/pasting a parameter (e.g., from a clipboard), and/or by selecting a parameter (e.g. from a dropdown list, a folder picker, etc.). A user may provide a dynamic input by identifying values that may be based, at least in part, on one or more earlier workflow steps of the workflow. In many instances, users may input incorrect values due to typographical errors, incorrect forms or formats, etc. Users of workflow automation products/tools often struggle with providing or selecting the correct input parameters. When workflow logic has an incorrect parameter, the workflow may fail or yield unpredictable results at runtime.

Workflow automation tools typically have limited ability to validate user inputs to ensure that a workflow executes successfully. In one solution, a workflow engine may make runtime calls when workflow logic is executed to validate the user-provided inputs. Such a runtime call approach is limited to static inputs, does not extend to dynamic inputs that come from a previous step of the workflow or another workflow, and requires storage to be populated with data that matches the criteria as defined in the workflow logic to verify against the user-provided inputs. Additionally, such an approach requires increased processing resources at runtime and can lead to design time user errors caused by incorrect input parameters.

Furthermore, where a workflow logic fails to execute successfully during runtime, error codes associated with the workflow are often difficult to understand for the workflow developer. For example, raw error messages generated by a workflow platform are often unclear, verbose, and/or otherwise unintelligible to an ordinary developer. As a result of this difficulty, a non-professional developer may struggle to determine what steps are necessary to ensure a successful run. In many cases, this may result in the developer attempting to fix the workflow logic through inefficient or uncertain methods, such as by trial and error, leading to unnecessary workflow executions and utilization of system resources.

Embodiments described herein address these and other issues by enabling easier and more accurate development of workflows. Embodiments enable invalid or incorrect parameters input by a user during the creation of a workflow (e.g., at design time) to be automatically healed or corrected to reduce the likelihood of an unsuccessful workflow execution at runtime. For instance, an input workflow parameter provided to a graphical user interface (GUI) of a workflow in development may be received. A determination may be made whether the input workflow parameter is valid or invalid (e.g., in a proper format, etc.). In response to a determination that the input workflow parameter is invalid, a replacement workflow parameter may be determined and automatically substituted in place of the input workflow parameter in the user interface during the design time of the workflow. Note that "design time" and "development time" are used interchangeably herein.

In some embodiments, the user may be notified of the automatically updated values at design time. Various types of input parameters may be automatically healed in accordance with techniques described herein, including email addresses, site uniform resource locators (URLs), expressions, queries (e.g., SQL and OData), and any other type of input that may be provided or identified during creation of a workflow. In one embodiment, the automatic healing of an input parameter may be carried out by consulting with the specific service upon which the input parameter is based (e.g., a service hosting one or more files/documents/lists which may be accessed through a URL) that may be configured to return a corrected value, by analyzing previously executed workflows and their inputs, and/or by relying on a machine learning based algorithm.

In this way, during design time of a workflow, an incorrect user-provided input may be automatically healed/corrected instantaneously, or nearly instantaneously via a workflow designer user interface. Accordingly, errors caused by providing or selecting invalid or incorrect parameters that may otherwise lead to unsuccessful workflow executions may be corrected at design time, resulting in a reduction in the number of failed executions.

Furthermore, in the event of a runtime error for a workflow, embodiments described herein may enable a workflow remediation instruction to be determined and provided to a user for repairing the failed workflow. For instance, failure information generated in response to a workflow logic runtime failure may be received. In one example, the failure information may comprise an error code, such as an Hypertext Transfer Protocol (HTTP) status code or error code (e.g., a "400 Bad Request" status code). The failure information may be parsed to identify a probable cause of the runtime failure. In example implementations, the probable cause of the runtime failure may be determined based on a failure analysis service (e.g., a historical analysis based on prior workflows, a machine learning engine, etc.). Based on the probable cause of failure, a remediation instruction may be determined and provided to a contact address along with the failure cause, enabling a developer to quickly and accurately repair the workflow.

As a result, the developer, which may be non-professional, need not analyze error codes associated with failed workflow to determine (or guess) how to repair unsuccessful workflows. Rather, an error remediation system may automatically provide the appropriate repair steps that may be easily understood by the developer in order to ensure a successful workflow execution.

These approaches have numerous other advantages, including but not limited to reducing the computing resources for the system responsible for executing workflow logic. For instance, because input parameters may be corrected during development of the workflow rather than at or after runtime, workflows that are likely to fail based on improper or invalid user inputs may be automatically corrected, thereby reducing the likelihood that a server will execute workflow logic that will be unsuccessful. Furthermore, even where runtime failures may be present, providing easily understandable failure cause and remediation instructions permits a developer to repair the workflow logic in a more efficient manner, thereby reducing trial and error repair methods that unnecessary expend system resources. As a result, by increasing the likelihood that a workflow will execute successfully, failed workflow executions are reduced and processing resources may thereby be preserved.

Additionally, embodiments described herein improve a graphical user interface to be enabled to make modifications to input workflow logic to minimize the likelihood of a failed execution. For example, during development of a workflow, if a developer inadvertently inputs an invalid workflow parameter, the developer may be enabled to view an automatic substitution of the invalid workflow parameter with a replacement workflow parameter. In another embodiment, the developer may be provided with a notification of the automatic substitution, further enhancing the user interface. Furthermore, where runtime errors have occurred, a developer may easily view and understand the appropriate remediation steps needed to repair a failed workflow. In some embodiments, an interactive link may be provided, such that when the interactive link is activated, the user interface associated with the workflow may display a field in which the remediation action may be implemented, thereby enhancing the efficiency by which a developer may repair a workflow through the user interface.

Example embodiments are described in the following sections for error recovery at design time and runtime of workflows. In the following description, a person that develops a user application using the techniques described herein is referred to as a "developer," to be distinguished from a person that uses the user application at runtime (a "user" or "end user"). It is noted, however, that a "developer," as referred to herein, does not need to have expertise in computer programming (e.g., may not have coding/programming experience or expertise). The embodiments described herein enable application development without special programming skills.

A. Example Workflow Development Embodiments

Development of workflows may be enabled in various ways in embodiments. For instance, FIG. 1 shows a workflow development system 100, according to an example embodiment. As shown in FIG. 1, system 100 includes a computing device 102, storage 104, a first network-based application 124A, a second network-based application 124B, and a server 134. Server 134 includes a workflow designer 106, a workflow library 118 (e.g., in storage), and an input correction system 142. Workflow designer 106 includes an UI generator 110 and a workflow logic generator 112. Computing device 102 includes a display screen 108 and a browser 136. Storage 104 stores a local application 122. System 100 is described as follows.

Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows created by workflow designer 106 during runtime of those workflows. Local application 122 may be any type of local application/service, such as a database application (e.g., QuickBooks®, a Microsoft® Excel® spreadsheet), a messaging application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, also referred to as "cloud" applications or services. Network-based applications 124A and 124B are accessible by computing device 102 over network 126, may be configured to perform data processing and/or data hosting operations, and may provide data 130A and 130B, respectively, to workflows created by workflow designer 106 during runtime of those workflows. Network-based applications 124A and 124B may each be any type of web accessible applications/services, such as database applications, social networking applications, messaging applications, financial services applications, news applications, search applications, web-accessible productivity applications, cloud storage and/file hosting applications, etc. Examples of such applications include a web-accessible SQL (structured query language) database, Salesforce.com™, Facebook®, Twitter®, Instagram®, Yammer®, LinkedIn®, Yahoo! ® Finance, The New York Times® (at www.nytimes.com), Google search, Microsoft® Bing, Google Docs™, Microsoft® Office 365, Dropbox™, Microsoft® SharePoint, etc. Although FIG. 1 shows two network-based applications, any number of network-based applications may be accessible over network 126, including numbers in the tens, hundreds, thousands, or greater numbers.

Note that data 128, data 130A, data 130B, and data 132 may each include any type of data, including messages, notifications, calculated data, retrieved data, and/or any other type of information requested or usable by a workflow.

Computing device 102 and server 134 may each include at least one network interface that enables communications with each other and with network-based applications 124A and 124B over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Workflow designer 106 is configured to be operated/interacted with to create workflows. For instance, a developer may access workflow designer 106 by interacting with an application at computing device 102 capable of accessing a network-based application, such as browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow.

As shown in FIG. 1, workflow designer 106 includes UI generator 110 and workflow logic generator 112. UI generator 110 is configured to transmit workflow GUI information 140 (e.g., one or more web pages, image content, etc.) to browser 136 to be displayed as workflow designer GUI 116 in display screen 108 in browser window 114. Workflow designer GUI 116 may be interacted with by the developer to select and configure workflow steps into a workflow. For example, the developer may insert and sequence a plurality of workflow steps in workflow designer GUI 116, with one or more of the steps being associated with a local or network-based application. Browser 136 stores the selected workflow steps, corresponding configuration information, and workflow step sequence information as constructed workflow information 138. Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked at runtime by an end user.

In accordance with embodiments disclosed herein, input correction system 142 may validate an input workflow parameter inputted by a user via an interactive user control of workflow designer GUI 116 during a development time of the workflow. For instance, when a developer inserts a workflow parameter, either by manually typing a parameter value or pasting a value from a clipboard, input correction system 142 may obtain the input workflow parameter 144 and determine whether the input workflow parameter is an invalid input to the workflow. Input correction system 142 may validate an input in a number of ways, including by interfacing with a validation service, such as a service provider to which the workflow parameter relates, a machine learning engine, and/or a historical analysis service. In an embodiment, input correction system may retrieve a replacement workflow parameter (e.g., a corrected parameter) from the validation service, and automatically substitute the invalid input workflow parameter with the replacement parameter during a development time of the workflow. Note that input correction system 142 may be external to workflow designer 106, as shown in FIG. 1, or may be partially or entirely included in workflow designer 106.

During runtime of the workflow, workflow logic 120 may invoke operation of one or more local or network-based applications associated with the workflow steps of workflow logic 120. Each workflow step may receive input data 128 from workflow designer GUI 116, data 132 from local application 122, data 130A or data 130B from one or both of local or network-based applications 124A and 124B, and/or data from another workflow step of workflow logic 120.

Figure 2:
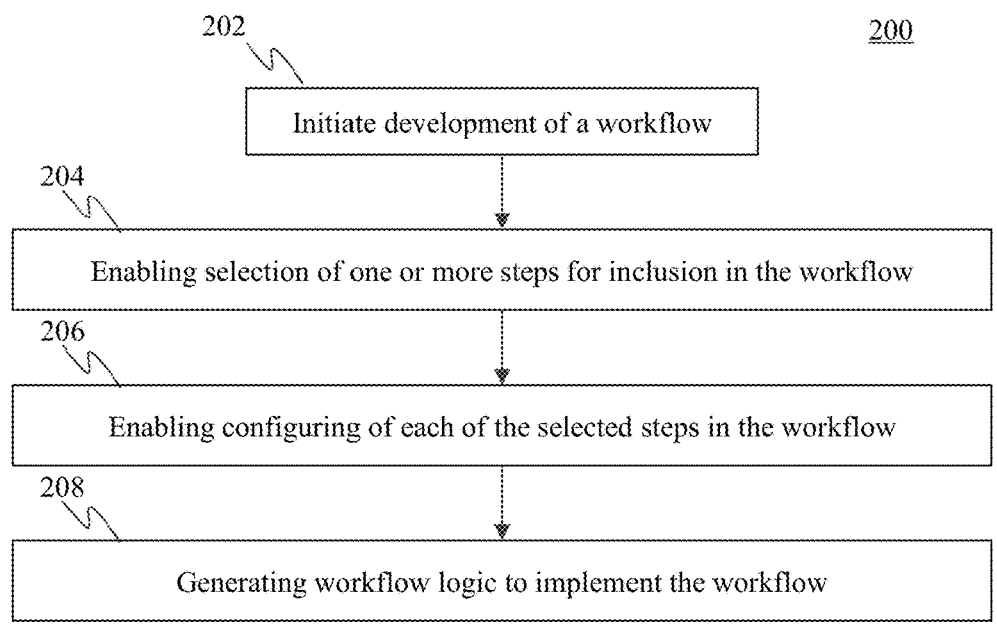
FIG. 2 shows a flowchart providing a process for development of workflows, according to an example embodiment.
Figure 3:
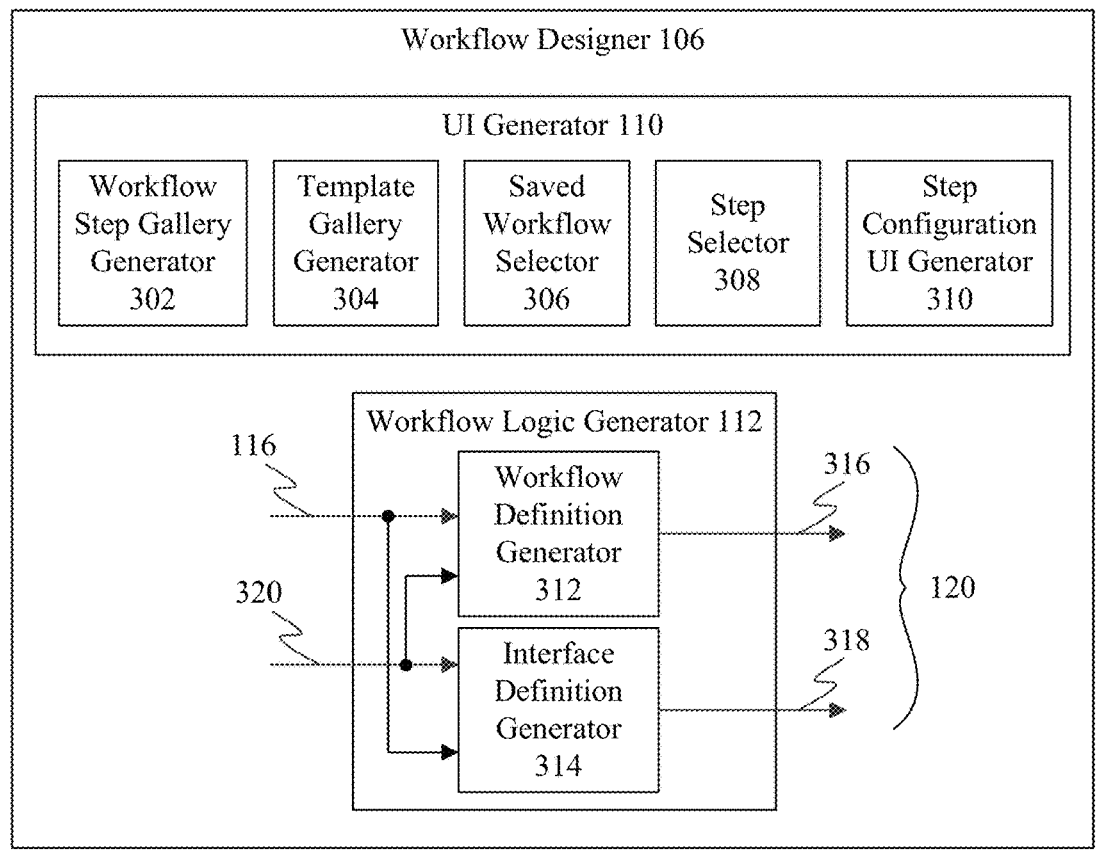
FIG. 3 shows a block diagram of a workflow designer application, according to an example embodiment.
Figure 4:
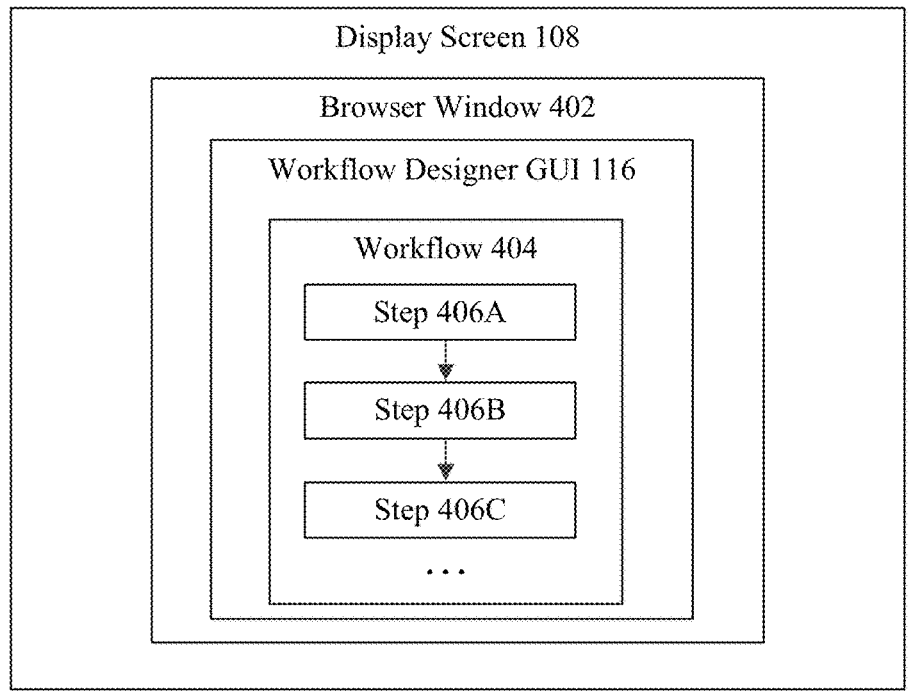
FIG. 4 shows a block diagram of a display screen showing a browser window displaying an exemplary workflow, according to an example embodiment.

Workflow designer 106 may operate in various ways, to enable development of a workflow. For instance, in embodiments, workflow designer 106 may operate according to FIG. 2. FIG. 2 shows a flowchart 200 providing a process for development of workflows, according to an example embodiment. Flowchart 200 and workflow designer 106 are described as follows with respect to FIGS. 3 and 4. FIG. 3 shows a block diagram of workflow designer 106, according to an example embodiment. As shown in FIG. 3, workflow designer 106 includes UI generator 110 and workflow logic generator 112. UI generator 110 includes a workflow step gallery generator 302, a template gallery generator 304, a saved workflow selector 306, a step selector 308, and a step configuration UI generator 310. Workflow logic generator 112 includes a workflow definition generator 312 and an interface definition generator 314. FIG. 4 shows a block diagram of display screen 108, illustrating an example of workflow designer GUI 116 displayed in browser window 402 on display screen 108, according to an example embodiment Flowchart 200 of FIG. 2 begins with step 202. In step 202, development of a workflow is initiated. For example, in an example embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin a new workflow.

For instance, a displayed page of workflow designer GUI 116 may display a gallery or workflow steps generated by workflow step gallery generator 302. The workflow step gallery includes a plurality of selectable workflow steps. The workflow steps may be stored in workflow library 118, and accessed for display by workflow designer GUI 116. The developer may select one of the workflow steps for inclusion in their workflow, and may proceed with configuring the contents of the workflow step, and/or may add additional workflow steps to continue generating their workflow.

For example, as shown in FIG. 4, workflow step gallery generator 302 may enable steps 406A, 406B, and 406C to be selected for insertion into a workflow 404 being assembled in workflow designer GUI 116. Any number of workflow steps may be inserted.

In another example, a displayed page of workflow designer GUI 116 may display a template gallery generated by template gallery generator 304. The template gallery includes a plurality of selectable workflow templates, which each include one or more workflow steps pre-connected for operation. The workflow templates may be stored in workflow library 118, and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, step 406C may have been subsequently added (e.g., from a workflow step gallery).

In another example, saved workflow selector 306 may enable the developer to select an existing, saved workflow to be opened for further editing in a displayed page of workflow designer GUI 116. The saved workflows may be stored in workflow library 118 or elsewhere. For example, saved workflow selector 306 may display a list of saved workflows, may enable navigation to a saved workflow, and/or may provide another mechanism for selecting a saved workflow for editing. The developer may then proceed with further configuring the contents of the workflow, and/or may add additional workflow steps to the workflow steps of the workflow to generate a more complex workflow.

In step 204, selection of one or more steps for inclusion in the workflow is enabled. When a developer is editing a workflow, step selector 308 may enable the developer to select further workflow steps for inclusion in the workflow, and to order the steps. The workflow steps may be accessed by step selector 308 in workflow library 118. For instance, step selector 308 may display a pull-down menu of workflow steps, a scrollable and/or searchable list of available workflow steps, or may provide the workflow steps in another manner, and may enable the developer to select any number of workflow steps from the list for inclusion in the workflow.

In one example, step selector 308 may enable a developer to select a step that is associated with a local application, such as Microsoft® Outlook®, or a network-based application, service, or connector, such as Microsoft® SharePoint or Facebook®. Step selector 308 enables the steps to be chained together in a sequence, optionally with conditional steps, for inclusion in workflow logic 120.

In step 206, each of the selected steps in the workflow is enabled to be configured. In an example embodiment, step configuration UI generator 310 enables configuration of each workflow step in a workflow. Step configuration UI generator 310 accesses each selected workflow step in workflow library 118 to determine the configuration of the workflow step, including all of its input parameters and any other selections or information that a user or developer needs to provide to the workflow step to configure it For example, step configuration UI generator 310 may generate a UI that enables the developer to type, navigate to, use a pull-down menu, or otherwise enter input data into a text input box or other data input element (e.g., input parameter) of a workflow step. The developer may configure an output of a prior step to be input data for a workflow step. Step configuration UI generator 310 may enable data or other objects to be copied and pasted, dragged and dropped, or otherwise entered copied from elsewhere into data input boxes of a workflow step.

In step 208, workflow logic to implement the workflow is generated. In an example embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) or RESTful API metadata in Swagger format, defining what are the necessary inputs and outputs (parameters) of the workflow step, such that a service may be accessed according to the API definition. In such an implementation, the operations in the workflow definition information 316 refer to the corresponding API metadata in the interface definition information 318 to give a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 shows views of an exemplary workflow in various phases of development using a development GUI, according to example embodiments. For example, each of FIGS. 5-8 show browser window 402 displaying a corresponding view of workflow designer GUI 116 being used to develop a workflow.

Figure 5:
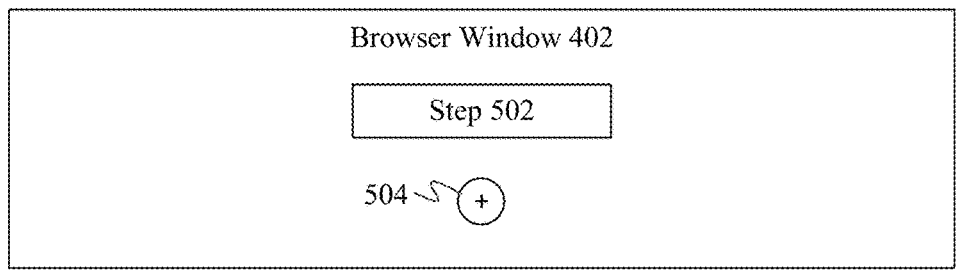
FIGS. 5-8 shows views of an exemplary workflow in various phases of development using a development GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of steps, a gallery of workflow steps, a template gallery, or elsewhere. A list, library, or gallery may include any number of workflow steps. The workflow steps may be associated with network-based applications mentioned elsewhere herein or otherwise known (e.g., Microsoft® SharePoint or Dropbox™), and/or with local applications mentioned elsewhere herein or otherwise known (e.g., Microsoft® Outlook®). Each workflow step is configured for plug-and-place into the workflow. Each workflow step is configured with the appropriate logic and/or interface(s) to perform its respective function(s), which may include communicating with a local or remote application. For instance, a workflow step may be configured to transmit a query to an application (e.g., a search query to a search engine, a database query to a database, a request for data from a social networking application, etc.), being pre-configured how to properly transmit and format such a request to the application. The workflow step may be configured to receive a response to the request, being pre-configured how to parse the response for desired response data. As such, a developer of a workflow does not need to know how to write program code in a programming language, to interface with complex application interfaces (e.g., application programming interfaces (APIs)), or to understand network communication protocols, as the workflow steps are already setup. When a workflow step is plugged into workflow logic by a developer, the developer configures the inputs to the workflow step (as described below), and the otherwise pre-configured workflow step handles any communications with other applications.

Figure 6:
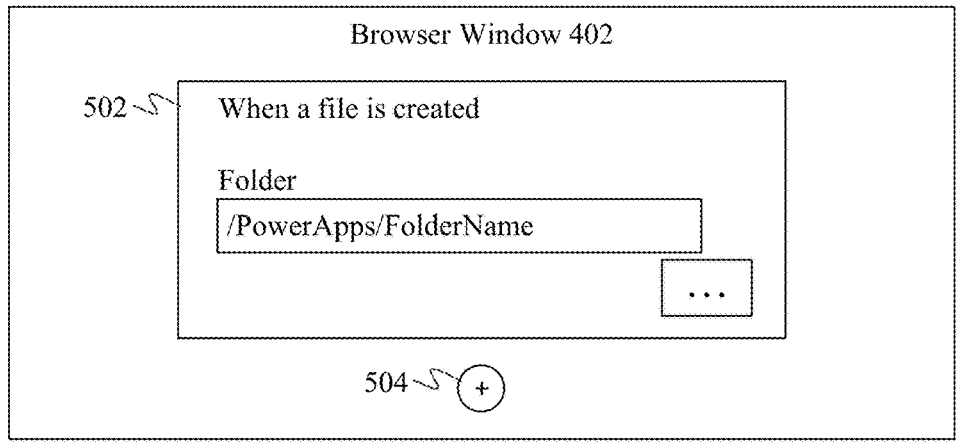

In FIG. 6, the developer has interacted with step 502 (e.g., by mouse click, etc.) to cause step configuration UI generator 310 to generate a UI for configuration of step 502. For instance, in the example of FIG. 6, workflow step 502 is configured to monitor for a file to be created in a particular folder identified by the developer in a text input box (e.g., by typing, clicking on a navigator indicated by " . . . ", etc.). When workflow step 502 determines a file is added to the indicated folder, a workflow step following workflow step 502 is triggered. Thus, workflow step 502 may be considered a trigger step in this example.

Figure 7:
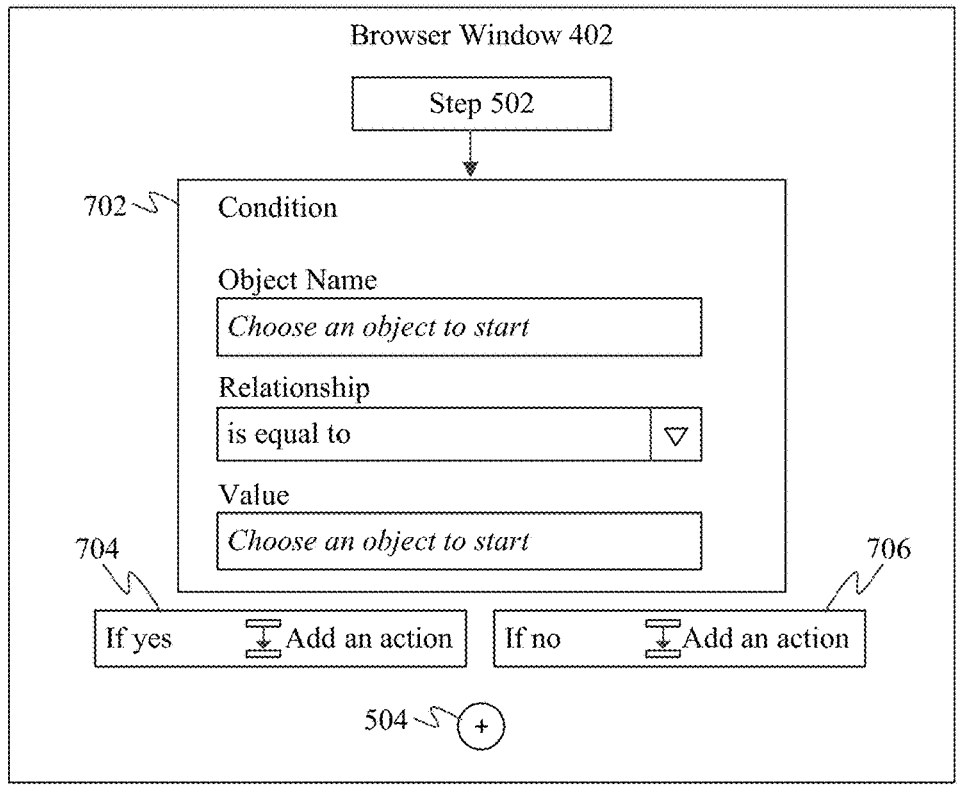

For instance, in FIG. 7, the developer interacted with add interface 504 to select a next workflow step 702. In an example embodiment, interaction with add interface 504 invokes step selector 308 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

In one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
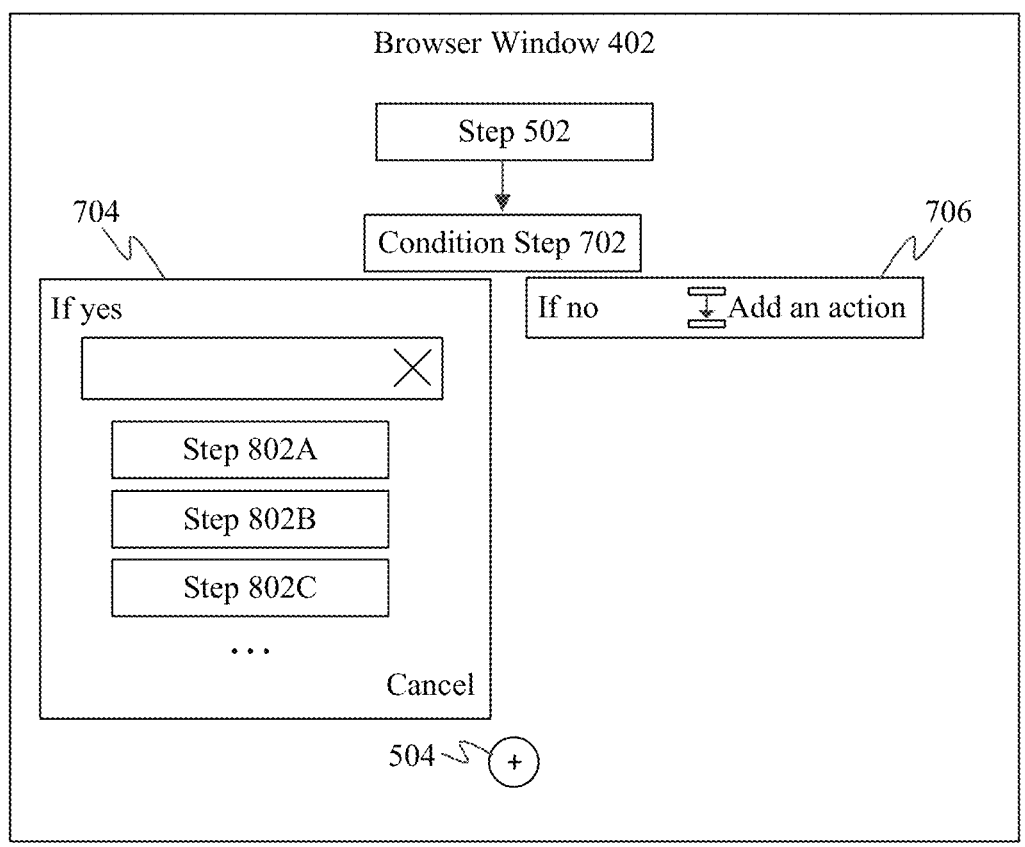

For example, in FIG. 8, the developer interacts with action workflow step 704 to define an action. In this example, the developer is defining action workflow step 704 by selecting a workflow step via step selector 308. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

B. Example Runtime Embodiments

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more applications, local or network-accessible, as was configured by the developer. Accordingly, the workflow performs its intended functions.

Figure 9:
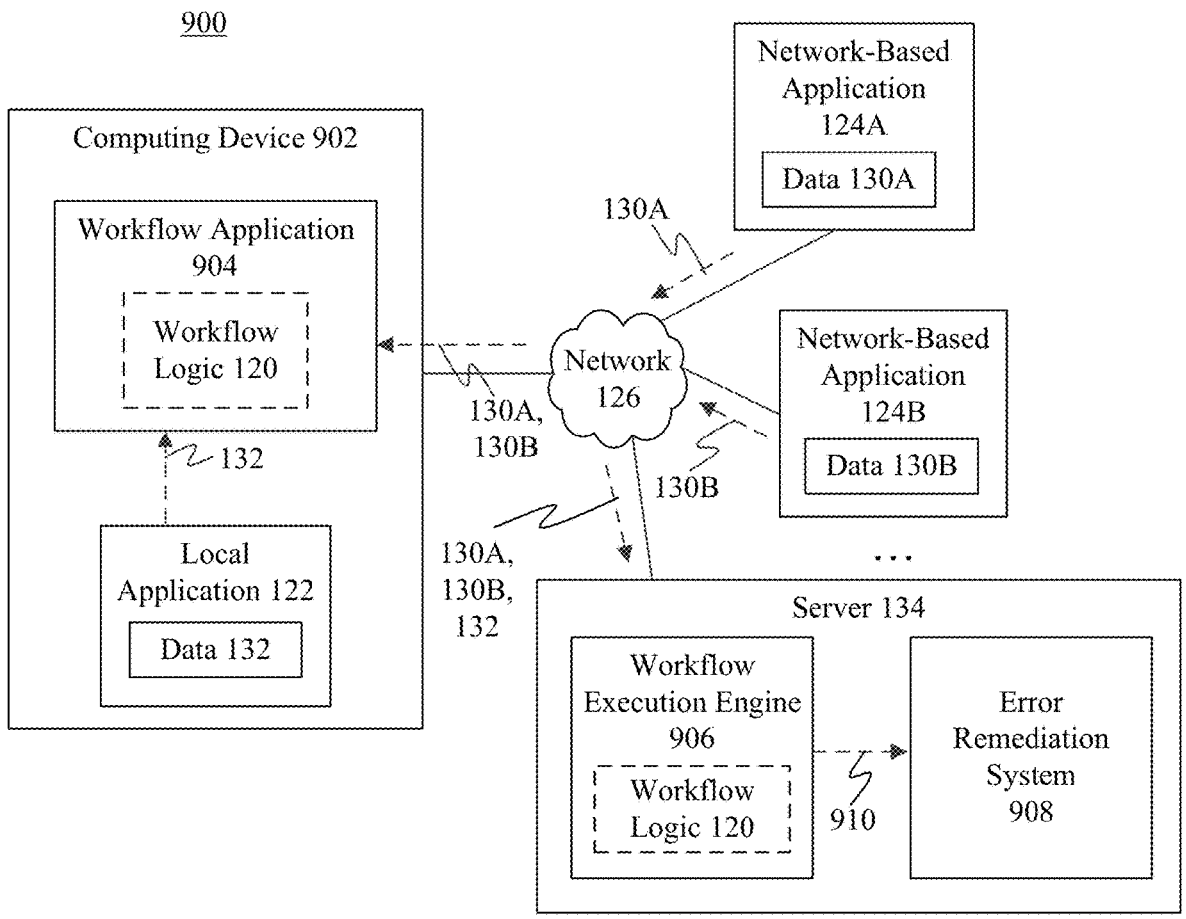
FIG. 9 shows a block diagram of a system for operating a workflow using a workflow execution engine coupled to an error remediation system, according to an example embodiment.

FIG. 9 shows a block diagram of a system 900 for operating a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906 and an error remediation system 908. System 900 is described as follows.

First and second network-based applications 124A and 124B are each optionally present, depending on the configuration of workflow logic 120. Further network-based applications may be present, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one example embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an example embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 102 for a selected workflow (e.g., selected from a workflow library by a user), and may execute workflow logic 102 to execute the workflow.

In another embodiment, workflow application 902 may be configured to execute workflows at computing device 902. For instance, an end user of computing device 902 may interact with a user interface of workflow application 902 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may operate in workflow application 904 at computing device 902 and a second portion of workflow logic 120 may operate in workflow execution engine 906 at server 134 and/or elsewhere.

In an event where workflow logic 120 does not execute successfully, workflow execution engine 906 may generate failure information 910 (e.g., an error message and/or an HTTP status code) associated with the failed execution. Failure information 910 may include information regarding a workflow (e.g., workflow triggers, actions, input parameters, resources or connectors utilized by the workflow, etc.), along with an error message associated with the runtime failure. In some examples, workflow execution engine 906 may store failure information 910 in a log or other repository, such as Microsoft® Master Data Services (MDS).

In implementations, error remediation system 908 may obtain failure information 910 to generate a remediation instruction to repair workflow logic 120. For instance, error remediation system 908 may analyze the failure information to identify a likely cause of the runtime failure of the workflow and determine one or more appropriate remediation instructions that may be applied to repair the workflow. Error remediation system 908 may transmit the probable cause of the runtime failure and the remediation instructions to a developer, e.g., by transmitting a message or notification to computing device 102, computing device 902, a computing device associated with the workflow and/or a contact address (e.g., an email address) associated with the workflow. Although it is shown herein that error remediation system 908 is implemented in server 134, it is understood that error remediation system may also be implemented in whole or in part in computing device 902 or elsewhere (e.g., on the cloud). In this manner, error remediation system 908 may determine a runtime failure cause and generate appropriate remediation instructions irrespective of the device on which the workflow logic is executed. Furthermore, error remediation system 908 may be external to workflow execution engine 906, as shown in FIG. 9, or may be partially or entirely included in workflow execution engine 906.

Figure 10:
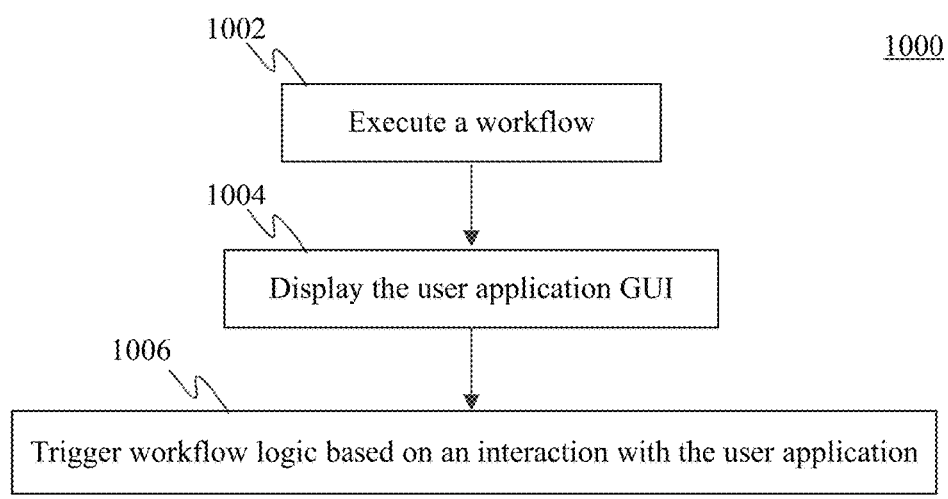
FIG. 10 shows a flowchart providing a process for executing a user application that includes one or more workflows, according to an example embodiment.

FIG. 10 shows a flowchart 1000 providing a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an example embodiment, an end user at computing device 902 may cause workflow logic 120 to be executed, such as by command line, by clicking/tapping or otherwise interacting with an icon representing the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other applications, local or network-based.

In step 1004, the workflow GUI is displayed. Step 1004 is optional, as in some embodiments, a GUI is not displayed for a workflow. In an example embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

Figure 11:
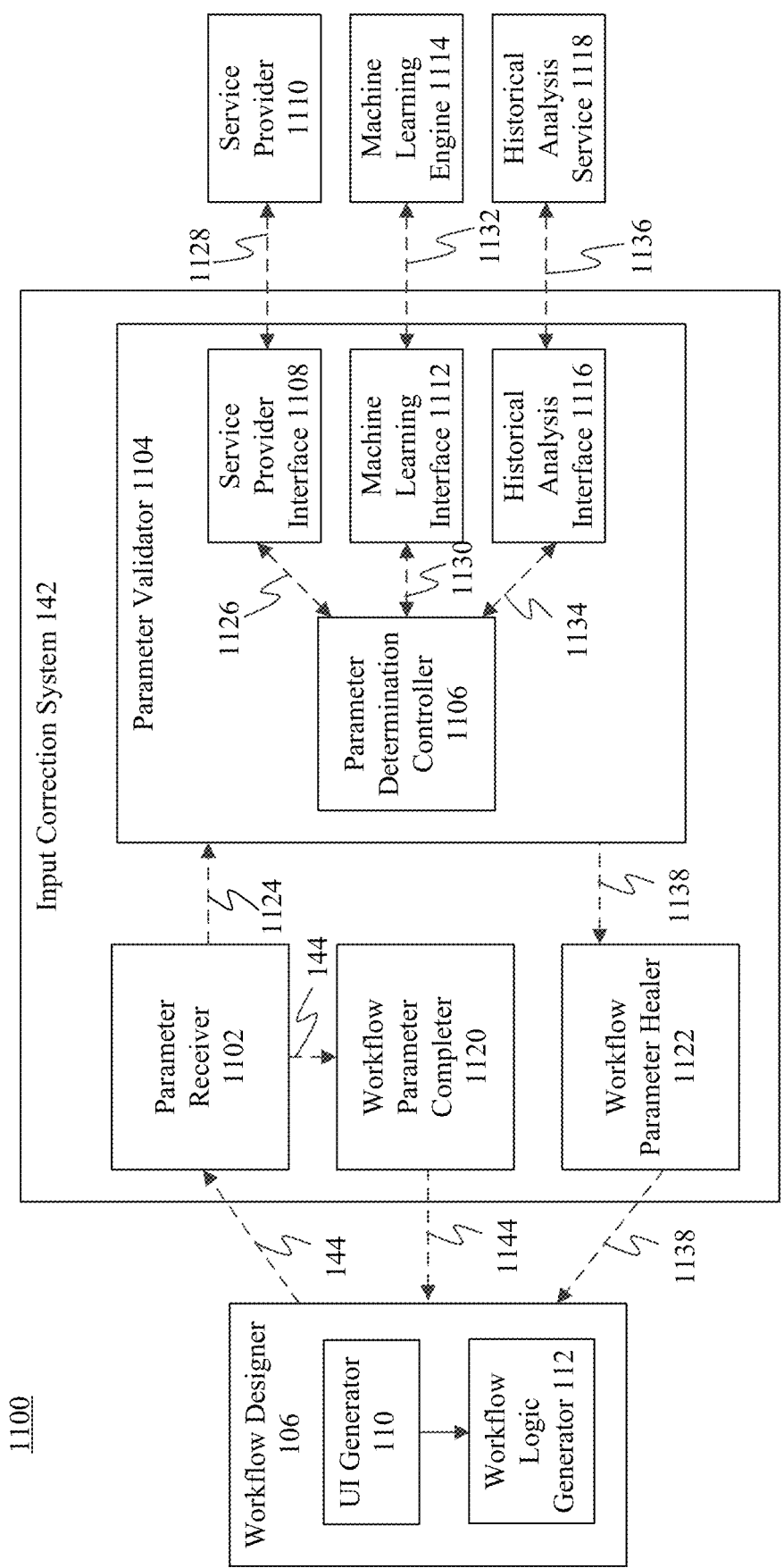
FIG. 11 shows a block diagram of an input correction system configured to auto-heal a user-provided input during design time, according to an example embodiment.

C. Example Embodiments for Automatically Healing User-Provided Inputs During Design Time of a Workflow FIG. 11 shows a block diagram of a system 1100 for automatically healing a user-provided input during design time of a workflow, according to an example embodiment. As shown in FIG. 11, system 1100 includes workflow designer 106, input correction system 142, a service provider 1110, a machine learning engine 1114, and a historical analysis service 1118. Workflow designer 106 and input correction system 142 may be implemented in computing device 102, server 134, or elsewhere, as described above with reference to FIG. 1. Input correction system 142 includes a parameter receiver 1102, a parameter validator 1104, a workflow parameter completer 1120, and a workflow parameter healer 1122. System 1100 is described as follows.

Service provider 1110, machine learning engine 1114, and historical analysis service 1118 are examples of input validation services, any one or more of which may be present, depending on the configuration of workflow logic 120 (e.g., a type of workflow input parameter). Further input parameter validation services may be present in accordance with techniques described herein.

In example embodiments, and as described above, users (e.g., developers) may utilize a template (e.g. an internal or external template to the development tool) during the creation of a workflow through workflow designer GUI 116. A template may comprise a preformed workflow. In some instances, a user may tailor the template based on the user's particular needs (e.g., by modifying one or more workflow steps and/or providing input parameters). For instance, a template may include one or more prepopulated parameters and/or one or more user-provided input workflow parameters 144. In some example embodiments, a template parameter may be modified by a user through workflow designer GUI 116.

In yet other embodiments, a user may create a workflow from scratch, which may require a user to identify each input workflow parameter relied upon in the one or more workflow steps that make up the workflow. For instance, a user may generate a workflow definition by interacting with workflow designer GUI 116 (e.g., by identifying triggers and workflow steps, inputting one or more parameters, etc.). Based on the user's interaction with workflow designer GUI 116, workflow designer 106 may generate a workflow machine representation of the workflow during design time (e.g., in real-time or near real-time).

In accordance with techniques described herein, input correction system 142 may automatically validate and/or heal an input workflow parameter provided by a user during design time of a workflow. In one example, a user creating a workflow using workflow designer GUI 116 may copy and paste (or manually type) a URL as an input workflow parameter for a particular workflow step as described above. In some instances, a workflow designer (e.g., workflow designer 106) may require that the URL for a particular field, connector, or service be provided in a particular format. In accordance with example embodiments, a user-provided URL may be validated to determine whether it the URL in the correct format, and/or automatically heal the URL by reformatting the URL provided by the user (e.g., by truncating or normalizing the URL).

Accordingly, input correction system 142 is configured to automatically validate and heal or correct a user-provided input workflow parameter 144 in a user interface control such as a text or other input box (e.g., provided through workflow designer GUI 116), of a workflow step in a workflow authoring/development system. Input workflow parameter 144 that may be validated and automatically healed or corrected according to techniques include, but are not limited to URLs (e.g., a URL identifying a remote repository or storage, such as a Microsoft® SharePoint URL), an email address, a name, another field of a workflow step, expressions, queries (e.g., SQL and OData), etc. Inputs may also include static inputs (e.g. by a user directly typing or pasting a parameter) or dynamic inputs (e.g., inputs from one or more previous workflow steps in the workflow, such as workflow tokens).

The validation and automatic healing may be performed in real time (or near real time) based on one or more techniques, including by interacting with a service provider 1110 to which the user-provided input relates or references (e.g., Microsoft® SharePoint), relying on one or more machine learning (ML) engines 1114, and/or interacting with a historical analysis service 1118 configured to analyze a history of user-provided inputs that resulted in successful and/or unsuccessful workflow executions, to identify invalid or incorrect inputs.

Figure 12:
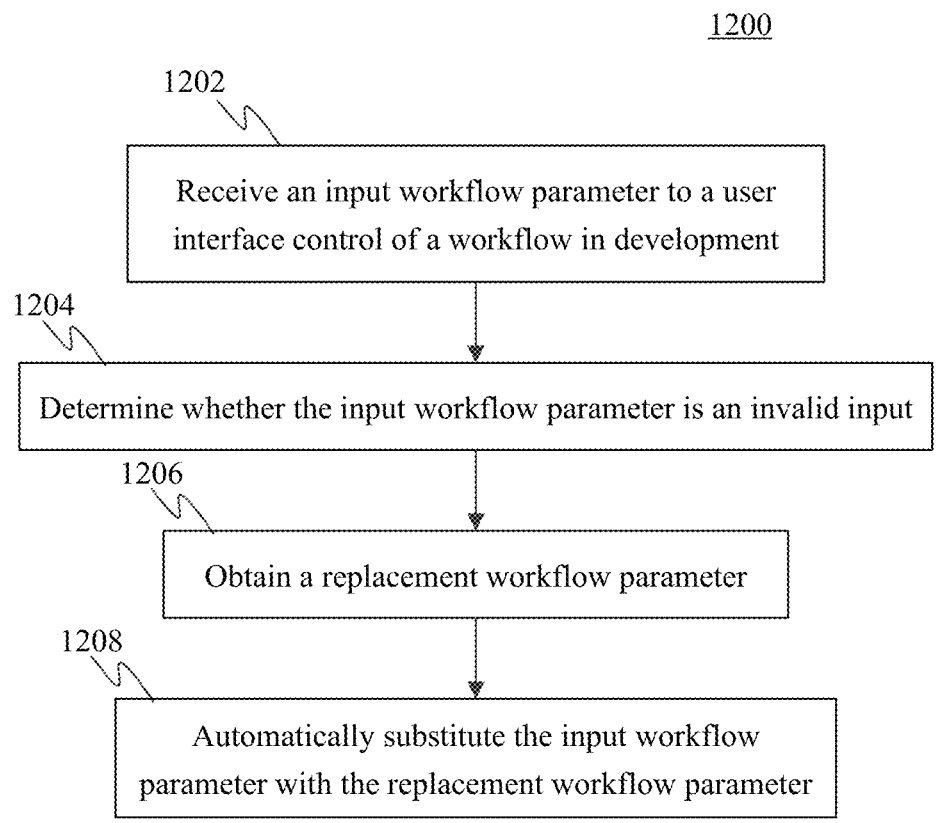
FIG. 12 shows a flowchart providing a process for automatically healing an invalid workflow parameter during the development of a workflow, according to an example embodiment.

Accordingly, in implementations, input workflow parameters may be automatically validated and healed. Input correction system 142 may annotate and heal input workflow parameter 144 in various ways. For example, FIG. 12 shows a flowchart 1200 of a method for automatically healing an invalid workflow parameter during the development of a workflow, according to an example embodiment. In an implementation, the method of flowchart 1200 may be implemented by input correction system 142. FIG. 12 is described with continued reference to FIG. 11. Other structural and operational implementations will be apparent to persons skilled in the relevant art(s) based on the following discussion regarding flowchart 1200 and system 1100 of FIG. 11.

Flowchart 1200 begins with step 1202. In step 1202, an input workflow parameter to a user interface control of a workflow in development is received. For instance, with reference to FIG. 11, parameter receiver 1102 may receive an input workflow parameter 144. Input workflow parameter 144 may be provided, e.g., by a user or developer, through workflow designer GUI 116 during development of a workflow. Workflow designer 106 may receive the input workflow parameter upon the user interaction with a user interface control (e.g., a text input field, an item selection option, a radio button selection, etc.) of workflow designer GUI 116 of the workflow in development and transmit the input workflow parameter 144 in real-time or near real-time to parameter receiver 1102 for validation. In other words, as a user or developer is interacting with a user interface control of workflow designer GUI 116 to design a workflow, parameter receiver 1102 may receive input workflow parameters inputted by the user in the user interface control during the development.

In example embodiments, input workflow parameter 144 may comprise a number of identifiers or values, and/or may correspond to a resource accessible via a service (e.g., service provider 1110). In some instances, an input workflow parameter may be defined by a parameter value, a parameter key, an operation ID, a connector ID, and/or a connection ID.

In one non-limiting illustrative example, a user may design a workflow in which an action or workflow step is to create an item, such as a list accessible via service provider 1110 (e.g., a Microsoft® SharePoint list) upon a certain triggering event (e.g., receiving an email). The user may input a URL in workflow designer GUI 116 corresponding to location of the list (e.g., a SharePoint URL) or other resource on a remote or cloud-based server, a document/resource management service implemented on one or more servers, etc. In accordance with embodiments, parameter receiver 1102 may receive the inputted SharePoint URL for validation to determine whether the URL is correct.

In step 1204, it is determined whether the input workflow parameter is an invalid input. For instance, with continued reference to FIG. 11, parameter validator 1104 obtains a validation request 1124 comprising input workflow parameter 144. Based on validation request 1124, parameter validator 1104 determines whether the input workflow parameter 1102 is an invalid input. As shown in FIG. 11, parameter validator 1104 comprises a parameter determination controller 1106, a service provider interface 1108, a machine learning interface 1112, and a historical analysis interface 1116.

In embodiments, parameter determination controller 1106 is configured to validate an input workflow parameter 144 in various ways. As shown in FIG. 11, parameter determination controller 1106 may validate input workflow parameter 144 by transmitting a request 1126 to service provider interface 1108, a request 1130 to machine learning interface 1112, and/or a request 1134 to historical analysis interface 1116. Requests 1126, 1130, and 1134 may comprise requests that include input workflow parameter 144 for validation by the respective validation service. Parameter determination controller 1106 may implement the suitable validation service interface using one or more APIs for interfacing with a service provider (e.g., resource or connector identified in the workflow), a machine learning engine, and/or a historical analysis service. In example embodiments, parameter determination controller 1106 may be configured to automatically utilize one or more validation services to validate/heal a user-provided input workflow parameter in the workflow designer GUI 116 using an appropriate validation service interface. In some examples, the validation service interface may be defined by a component that represents the workflow definition in JSON. Although FIG. 11 shows an implementation that includes service provider interface 1108, machine learning interface 1112, and historical analysis interface 1116, it is understood that parameter validator 1104 and parameter determination controller 1106 may implement any other validation service interface (and corresponding validation service) as appreciated by one of ordinary skill in the art.

Through interaction with the one or more of the validation services, parameter validator 1104 may validate an input workflow parameter inputted by a user developing a workflow through workflow designer GUI 116. In implementations, the response of the one or more API requests may be received by parameter validator 1104 and may comprise a validation result and/or one or more corrected or suggested input parameters during development of a workflow.

In other implementations, an API, or similar interface for interacting with a validation service, may not be available to validate input workflow parameter 144, but may instead be implemented parameter validator 1104 itself. For instance, parameter validator 1104 may determine whether input workflow parameter 144 (e.g., identifying a resource, email address, etc.) is correct based on a validation technique internal to or implemented within parameter validator 1104 to determine whether the inputted parameter is incorrect and/or identify a replacement parameter.

In step 1206, a replacement workflow parameter is obtained. For instance, with continued reference to FIG. 11, workflow parameter healer 1122 may obtain a replacement workflow parameter 1138 from parameter validator 1104 in response to a determination that that input workflow parameter 144 is an invalid input to the workflow in development. Parameter validator 1104 may receive such a parameter in a variety of ways, including through service provider interface 1108, machine learning interface 1112, historical analysis interface 1116, or any other suitable manner as described herein.

In some example embodiments, replacement workflow parameter 1138 may comprise a corrected workflow parameter based on input workflow parameter 144. For instance, replacement workflow parameter 1138 may be a modified version of input workflow parameter 144 in a reformatted form, may correct a typographical error, may be a truncated version of input workflow parameter 144, or any other revised version of workflow parameter 144 appropriate for entry in workflow designer 106. In other example embodiments, replacement workflow parameter 1138 may comprise a suggested workflow parameter. For instance, where a confidence value associated with a corrected parameter received by parameter validator 1104 is below a threshold value, workflow parameter healer 1122 may obtain replacement workflow parameter 1138 as a recommended replacement parameter.

In step 1208, the input workflow parameter is automatically substituted with the replacement workflow parameter in the user interface control of the workflow in development. For example, if service provider 1110 (or another validation service) returns a replacement parameter in response to an appropriate API request, workflow parameter healer 1122 may be configured to automatically substitute input workflow parameter 144 with replacement workflow parameter 1138 in workflow designer 106. Accordingly, in response to a determination that input workflow parameter 144 is an invalid input to the workflow in development, workflow designer 106 may replace the invalid input with a replacement input parameter in the appropriate field during development of the workflow.

In implementations, UI generator 110 of workflow designer 106 may be configured to display, via workflow designer GUI 116, the automatic substitution of the input workflow parameter with the replacement workflow parameter during development of the workflow in the user interface control in which input workflow parameter 144 was received. In this manner, because the substitution is displayed in the GUI used to develop a workflow, a user or developer may view such a substitution in the user interface control of the GUI in real-time or near real-time. As one non-limiting example, where the replacement workflow parameter comprises a truncated version of an incorrect user-inputted URL, workflow parameter healer 1122 may automatically substitute the incorrect user-inputted URL with the truncated URL. It is noted that embodiments herein are not limited to correcting URLs, such as SharePoint URLs (e.g., identifying list locations or other SharePoint URLs), but may encompass automatically validating and healing any other type of user inputted parameter. As a result, workflow parameter healer 1122 may automatically heal the user inputted parameter by substituting the incorrect parameter with the corrected parameter at design time, thereby reducing the risk of an unsuccessful execution due to an invalid input parameter. In implementations, the response of the one or more API requests may be received by the workflow designer UI and/or the workflow machine representation and automatically heal or correct an input parameter (e.g., as defined by the parameter value) as appropriate based on the response.

In some example embodiments, where an inputted parameter cannot be fully validated, a validation service may return one or more suggested or recommended replacement parameters to substitute in place of the input workflow parameter 144. The suggested or recommended replacement parameters may also include a confidence score or the like indicating a likelihood that the suggested or recommended replacement parameters should be utilized in the workflow in development. In such examples, workflow parameter healer 1122 may transmit the suggested or recommended replacement parameter(s) (or a subset thereof) 1138 to workflow designer 106. In some implementations, the determination of whether to transmit one or more suggested or recommended replacement parameter(s) to workflow designer 106 may be based on a confidence score associated with the suggested or recommended replacement parameter(s). For instance, parameters with confidence scores exceeding a threshold value may be transmitted for application to workflow designer 106, while confidence scores below a threshold may be withheld.

UI generator 110 may cause workflow designer GUI 116 to display each of the suggested or recommended replacement parameter(s) (or a subset thereof) in workflow designer GUI 116 for confirmation and/or selection by the user. For instance, the suggested or recommended replacement parameters 1138 may be displayed in a drop-down menu, a list, as selectable elements, etc. in workflow designer GUI 116 such that the user may select the appropriate corrected parameter during development of the workflow prior to executing the workflow, thereby facilitating the reduction of workflow runtime errors caused by invalid input parameters.

In some example embodiments, workflow designer GUI may generate a notification (e.g., visual, audio, etc.) that input workflow parameter 144 was incorrect and has been automatically healed during design of the workflow by substitution of the parameter with replacement workflow parameter 1138. In other examples, workflow designer GUI 116 may automatically substitute input workflow parameter 144 with the replacement workflow parameter 1138 without providing a notification. In yet some other implementations, a user may interact with workflow designer GUI 116 to toggle such notifications on or off depending on the preferences of the user.

Figure 13:
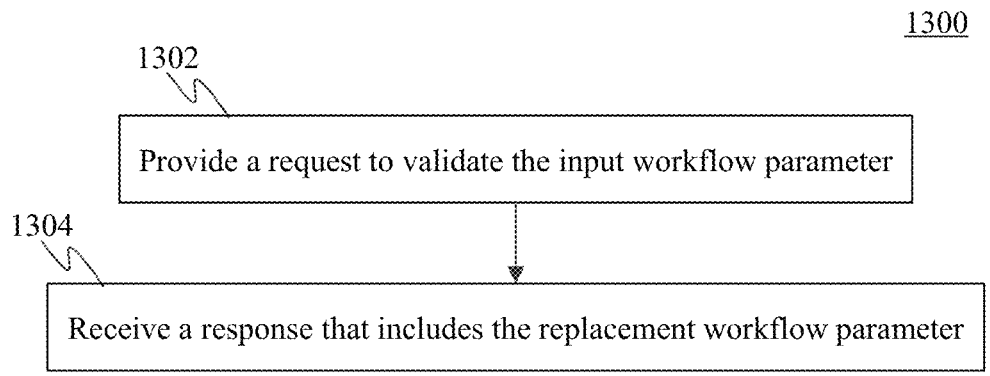
FIG. 13 shows a flowchart providing a process for retrieving a replacement workflow parameter from a validation service, according to an example embodiment.

As described above, parameter validator 1104 may validate input workflow parameter 144 in various ways. For example, FIG. 13 shows a flowchart 1300 of a method for receiving a replacement workflow parameter from a validation service, according to an example embodiment. In an implementation, the method of flowchart 1300 may be implemented by parameter validator 1104. FIG. 13 is described with continued reference to FIG. 11. Other structural and operational implementations will be apparent to persons skilled in the relevant art(s) based on the following discussion regarding flowchart 1300 and system 1100 of FIG. 11.

Flowchart 1300 begins with step 1302. In step 1302, a validation request is provided to validate the input workflow parameter. For instance, with reference to FIG. 11, parameter validator 1104 may receive a request 1124 to validate an input workflow parameter 144 from parameter receiver 1102. Parameter determination controller 1106 may provide validation request 1124 to one or more parameter validation services to validate input workflow parameter 144.

For instance, parameter determination controller 1106 may direct service provider interface 1108, machine learning interface 1112, and/or historical analysis interface 1116 to interact with service provider 1110 (e.g., a resource or connector identified in the workflow), machine learning engine 1114, and/or a historical analysis service 1118, respectively, to validate and/or identify a corrected or suggested parameter based on the signals. In example embodiments, machine learning interface 1112, and/or historical analysis interface 1116 may interact with service provider 1110, machine learning engine 1114, and/or a historical analysis service 1118, respectively, using one or more API requests. For example, service provider interface 1108 may enable interaction with service provider 1110 over signals 1128 through an API provided by service provider 1110. Machine learning interface 1112 may enable interaction with machine learning engine 1114 over signals 1132 through an API provided by machine learning engine 1114. Historical analysis interface 1116 may enable the interaction with historical analysis service 1118 over signals 1136 through an API provided by historical analysis service 1118. Signals 1128, 1132, and 1136 may comprise, for instance, validation requests including input workflow parameter 144 for validation. Based on interaction with an appropriate validation service (or a plurality of services), parameter validator 1104 may validate an input workflow parameter inputted by a designer during development of a workflow.

In one example embodiment, parameter determination controller 1106 may direct service provider interface 1108 to interact with service provider 110 for which the inputted parameter relates (e.g., a cloud repository or storage), to validate an input workflow parameter. For instance, service provider 1110 may provide an API through which parameter determination controller 1106 and service provider interface 1108 may validate the user-provided input workflow parameter. As an example, service provider interface 1108 may make an API call to service provider 1110, resource owner, or connector (e.g., a cloud or remote service, such as Microsoft® SharePoint that may be implemented on one or more servers) to validate the input workflow parameter.

In another example embodiment, parameter determination controller 1106 may direct machine learning interface 1112 to interact with machine learning engine 1114 and/or direct historical analysis interface 1116 to interact with historical analysis service 1118 to validate a workflow parameter. For example, machine learning engine 1114 and/or historical analysis service 1118 may store and analyze information regarding previously executed workflows. In example embodiments, the successful or unsuccessful execution of one or more previous workflows, along with inputs (e.g., both user-provided inputs and dynamic inputs) for each workflow, may be tracked and stored in a repository (e.g., a local storage, a cloud-based storage, etc.) accessible by machine learning engine 1114 and/or historical analysis service 1118. Based on information regarding previous workflows, parameter validator 1104 may rely on machine learning engine 1114 and/or historical analysis service 1118 (e.g., though an API or any other suitable manner) to validate an inputted parameter.

In example embodiments, service provider 1110, machine learning engine 1114 and/or historical analysis service 1118 may be implemented locally (e.g., on an end-user machine), on a workflow designer UI, and/or be on one or more cloud-based or remotely located servers. In some examples, machine learning engine 1114 and/or historical analysis service 1118 may analyze prior workflows associated with a particular user, a particular group or groups of users (e.g., one or more departments or teams), an organization or company, and/or users across the cloud (e.g., across different or unaffiliated entities or organizations). In other example embodiments, machine learning engine 1114 and/or historical analysis service 1118 may be focused on particular workflows (e.g., previous workflows that are relevant or similar to the currently developed workflow, or target the same or similar scenarios, subject matter, and/or fields).

In step 1304, a response that includes the replacement workflow parameter is received. For instance, with reference to FIG. 11, service provider interface 1108 may receive a response 1128 from service provider 1110, machine learning interface 1112 may receive a response 1132 from machine learning engine 1114, and/or historical analysis interface 1116 may receive a response 1136 from historical analysis service 1118 that includes a replacement workflow parameter comprising a corrected version of input workflow parameter 144. In accordance with techniques described herein, the replacement workflow parameter may be provided to workflow parameter healer 1122 for substitution in workflow designer 106 during development of a workflow.

In a non-limiting illustrative example, a user may design a workflow using workflow designer GUI 116 in which an action or workflow step is to create an item, such as a list (e.g., a Microsoft® SharePoint list) upon a certain triggering event (e.g., receiving an email). The user may input a URL in workflow designer GUI 116 corresponding to location of the list (e.g., a SharePoint URL) or other resource on a remote or cloud-based server, a document/resource management service implemented on one or more servers, etc. In accordance with embodiments, parameter determination controller 1106 may determine that service provider 1110 (e.g., a Microsoft® SharePoint service) is associated with the workflow step having the user interface control in which input workflow parameter 144 was received and therefore attempt to utilize service provider 110 to validate input workflow parameter 144. Accordingly, parameter determination controller 1106 may validate the inputted SharePoint URL in real-time or near real-time by directing service provider interface 1108 to make an API call to service provider 1110 to determine whether the inputted SharePoint URL is invalid. In this example, service provider 1110 is aware of URLs that are valid with respect to its SharePoint service (e.g., stores a list of available paths and stored file system objects, and/or can verify the presence of particular paths and/or file system objects, corresponding to received URLs). If the inputted SharePoint URL is invalid, service provider 1110 may return a corrected parameter to service provider interface 1108 in response to the API call, or may return an indication that the inputted SharePoint URL is correct if service provider 1110 successfully validates the URL.

For instance, a user may input a SharePoint URL in a workflow step as "www.example.com/teams/user/lists/xlist" in workflow designer GUI 116. Upon inputting the SharePoint URL, parameter determination controller 1106, at design time, causes service provider interface 1108 to make an appropriate API call to service provider 1110 or resource owner (e.g., SharePoint) to validate the inputted URL. In the illustrative example, the inputted URL may be determined by service provider 1110 or resource owner to be in an improper format (e.g., due to inclusion of superfluous and/or unnecessary folders/descriptors in the URL due to the user having cut/copied the URL from a browser or document). In such a scenario, service provider 1108 or the resource owner, in response to the API call, may return a truncated URL (e.g., "www.example.com/teams") to service provider interface 1108 that has a proper format for the workflow step.

Thus, where a developer provides an input workflow parameter 144 that relates to a resource provided by service provider 1110 as an invalid URL, an incorrect URL (e.g., contains a typographical error), or a URL that is in a non-compliant format, an API call to service provider 1110 may return an indication that the inputted parameter is not proper, and/or may return a corrected parameter if one is identified. In this manner, the inputted SharePoint URL (or any other input workflow parameter) may be validated during a time in which the workflow is being developed, rather than at runtime.

In another example embodiment, parameter determination controller 1106 may direct machine learning interface 1112 to interact with machine learning engine 1114 and/or direct historical analysis interface 1116 to interact with historical analysis service 1118 to validate and/or obtain a corrected workflow parameter. For example, machine learning engine 1114 and/or historical analysis service 1118 may store and analyze information regarding previously executed workflows. In example embodiments, the successful or unsuccessful execution of one or more previous workflows, along with inputs (e.g., both user-provided inputs and dynamic inputs) for each workflow, may be tracked and stored in a repository (e.g., a local storage, a cloud-based storage, etc.) accessible by machine learning engine 1114 and/or historical analysis service 1118. Based on information regarding previous workflows, parameter validator 1104 may rely on machine learning engine 1114 and/or historical analysis service 1118 (e.g., though an API or any other suitable manner) to validate an inputted parameter and obtain a corrected parameter in the event the inputted parameter is invalid.

For example, machine learning engine 1114 and/or historical analysis service 1118 may analyze one or more prior workflows to determine whether the workflow(s) were successfully executed, along with the inputted parameters that led to the successful execution of such workflow(s). In another example, machine learning engine 1114 and/or historical analysis service 1118 may analyze one or more unsuccessfully executed workflow(s), along with the parameters that were inputted in the unsuccessful workflow(s) and/or parameters that may have cause the workflow(s) to fail. For example, a common input parameter may be identified as a reason for failure across a plurality of unsuccessfully executed workflows. In such an example, machine learning engine 1114 and/or historical analysis service 1118 may analyze one or more successfully executed workflows to identify a corrected input parameter, or one or more suggested input parameters. Note that in an embodiment, historical analysis service 118 may analyze historical information, such as information related to previously executed workflows, to determine a historical model for correcting input parameters, while machine learning engine 1114 may receive input training data, as well as optionally analyzing historical information, to generate a learned model for correcting input parameters.

Example embodiments may also track further workflow related information in addition to an indication of whether the workflow was executed successfully or unsuccessfully. For instance, machine learning engine 1114 and/or historical analysis service 1118 may track and/or store, for each tracked workflow, one or more triggers for the workflow, actions or workflow steps, the services or connectors identified in the workflow, other user inputted parameters to the workflow, the types and/or subject matter of the workflow and/or workflow steps (e.g., workflow scenarios or fields), dynamic inputs to the workflow, parameters based on one or more workflow templates, URLs identified in the workflow, and/or the workflow step at which the execution failed in the event of an unsuccessful execution.

By relying on such a machine-learning based algorithm and/or historical analysis, parameter validator 1104 may automatically determine the input parameters that led to a successful and/or unsuccessful workflow, and obtain a corrected parameter (or one or more suggested parameters) from machine learning engine 1114 and/or historical analysis service 1118. For example, based on previously executed workflows, machine learning engine 1114 and/or historical analysis service 1118 may determine how to format and/or structure a particular parameter (e.g., a URL) provided as an input in a workflow, and automatically provide such a parameter to parameter validator 1104 in response to a request (e.g., a suitable API request).

In some example embodiments, machine learning engine 1114 and/or historical analysis service 1118 may be utilized where a threshold number of previous workflows (successful and/or unsuccessful) have been tracked and/or stored. In other example embodiments, machine learning engine 1114 and/or historical analysis service 1118 may be configured to determine a confidence value associated with a corrected or suggested input parameter and return such value to parameter validator 1104. For instance, if a confidence value is not above a first threshold, parameter validator 1104 may ignore the corrected or suggested parameter. If the confidence value is between a first threshold and a second threshold, parameter validator 1104 may cause input correction system 142 to provide a suggested value in workflow designer GUI 116, and/or an indication that a suggested or recommended parameter value has been provided. In another example, if the confidence value is above the second threshold, parameter validator 1104 may cause input correction system 142 to automatically replace the inputted parameter with the corrected value and/or provide a notification in the workflow of the replacement in the workflow designer GUI 116.

Figure 14:
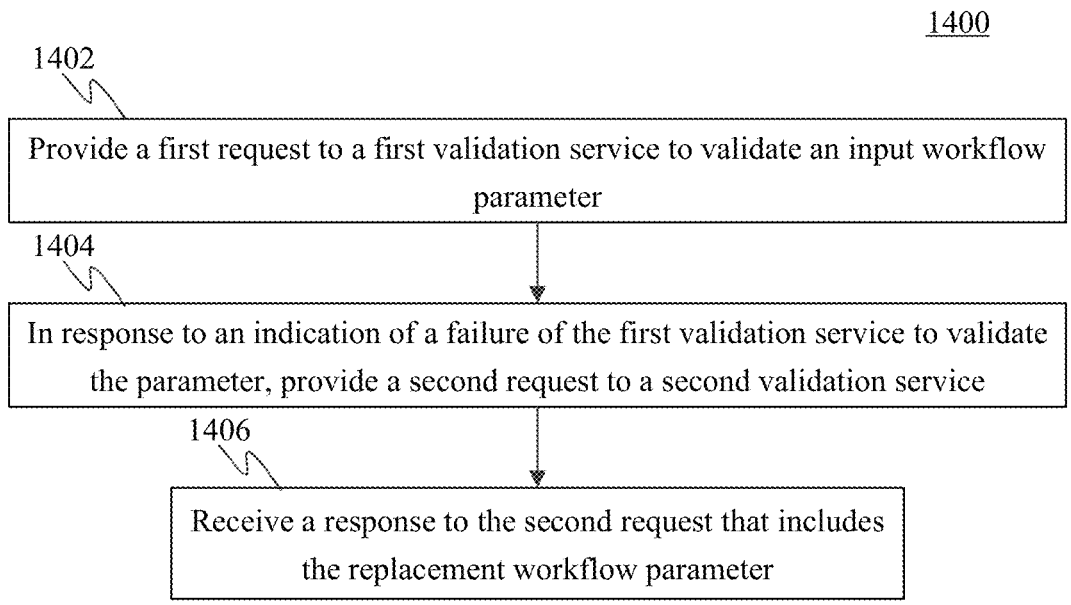
FIG. 14 shows a flowchart providing a process for sequencing multiple validation services to validate an input workflow parameter, according to an example embodiment.

As described above, parameter validator 1104 may validate input workflow parameter 144 through various validation services. For example, FIG. 14 shows a flowchart 1400 of a method for requesting multiple validation services to validate an input workflow parameter, according to an example embodiment. In an implementation, the method of flowchart 1400 may be implemented by parameter determination controller 1106. FIG. 14 is described with continued reference to FIG. 11. Other structural and operational implementations will be apparent to persons skilled in the relevant art(s) based on the following discussion regarding flowchart 1400 and system 1100 of FIG. 11.

Flowchart 1400 begins with step 1402. In step 1402, a first request is provided to a first validation service to validate an input workflow parameter. For instance, with reference to FIG. 11, parameter determination controller 1106 may direct any one of a plurality of validation service interfaces (e.g., service provider interface 1108, machine learning interface 1112, or historical analysis interface 1116) to provide a request to validate input workflow parameter 144. In implementations, depending on a particular context or scenario, one or more of the above techniques for validating a user-provided input may be appropriately chosen by parameter determination controller 1106. In some examples, the technique utilized for validation may be based on input workflow parameter 144 (e.g., as defined by a parameter value, a parameter key, an operation ID, a connector ID, and/or a connection ID) and/or the type or context of the input field presented in workflow designer GUI 116.

For example, where a particular connector (e.g., a resource owner or service provider) has made available an API which may be utilized to validate an input parameter associated with the connector, parameter validator 1104 may utilize such an API to validate the input parameter. In other instances, such as where no API is provided by service provider 1110, parameter validator 1104 may validate input workflow parameter 144 through interaction with machine learning engine 1114 and/or historical analysis 1118, as described above. In other examples, parameter validator 1104 may rely a combination of techniques to validate a particular input workflow parameter, or may utilize different techniques to validate different parameters in the same workflow.

In step 1404, in response to an indication of a failure of the first validation service to validate the input workflow parameter, a second request is provided to a second validation service to validate the parameter. For instance, parameter determination controller 1106 may direct a second validation service interface (e.g., any one of service provider 1108, machine learning interface 1112, or historical analysis interface 1116) to provide a second request to validate input workflow parameter 144 in response to an indication from a first validation service of a validation failure. In other words, parameter determination controller 1106 may be configured to utilize a second validation service for validating an input parameter in an event where a first validation service is unable to validate the input parameter. In this manner, parameter determination controller 1106 may utilize a combination of services to attempt to validate input workflow parameter 144 during development of a workflow.

In one example embodiment, parameter determination controller 1106 may first direct service provider interface 1108 to provide a request to service provider 1110 to validate input workflow parameter 144 during development of a workflow. If service provider 1110 is unable to determine whether input workflow parameter 144 is invalid, parameter determination controller 1106 may direct machine learning interface 1112 to provide a second request to machine learning engine 1114 to validate input workflow parameter. In another example embodiment, parameter determination controller 1106 may direct historical analysis interface 1116 to provide a second request to historical analysis service 1118 to validate input workflow parameter. It is noted that the example embodiments discussed herein are not intended to be limiting, and may include any other manner of selecting an appropriate validation service for providing a first request and/or a second request (or any subsequent validation requests). For instance, the first validation request may be made using machine learning interface 1112 or historical analysis interface 1116, and a second validation request may be made via service provider 1108.

In step 1406, a response to the second request that includes the replacement workflow parameter is received. For instance, with reference to FIG. 11, parameter determination controller 1106 may receive a response to a request (e.g., an API request or the like) from a second validation service (e.g., service provider 1110, machine learning engine 1114, or historical analysis service 1118) comprising a replacement workflow parameter that is a corrected version of input workflow parameter 144, in a similar manner as described above with reference to step 1204 of FIG. 12.

Accordingly, in example embodiments, a combination or permutation of the above techniques may be used to validate and/or automatically heal a user-provided input workflow parameter. For instance, one or more of the above techniques may be used depending on the field being populated by the user, whether the input is static or dynamic, the connector or resource owner for which the user-provided input workflow parameter is associated, etc. By dynamically determining which one or more of the above techniques to use for a particular workflow parameter (e.g., based on the context of the service or connector, the input type, etc.), the accuracy of and likelihood of the successful operation of the workflow may be increased.

It is noted that although parameter determination controller 1106 may be configured to utilize one technique prior to utilizing another technique for validation, parameter determination controller 1106 may utilize one or more techniques in parallel to simultaneously validate input workflow parameter 144 during development of a workflow. Moreover, since the parameters may be validated and/or healed based on an appropriate API or previously executed workflows, parameter validator 1104 need not obtain user information (e.g., user credentials for service provider 1110) to validate such parameters, since the appropriate validation service may be configured to validate input parameters based on the content of requests 1128, 1132, and/or 1136. Accordingly, the combination of the above techniques may be utilized across various different types of workflow and parameters to validate and automatically heal inputs with minimal user involvement in real-time or near real-time.

Figure 15:
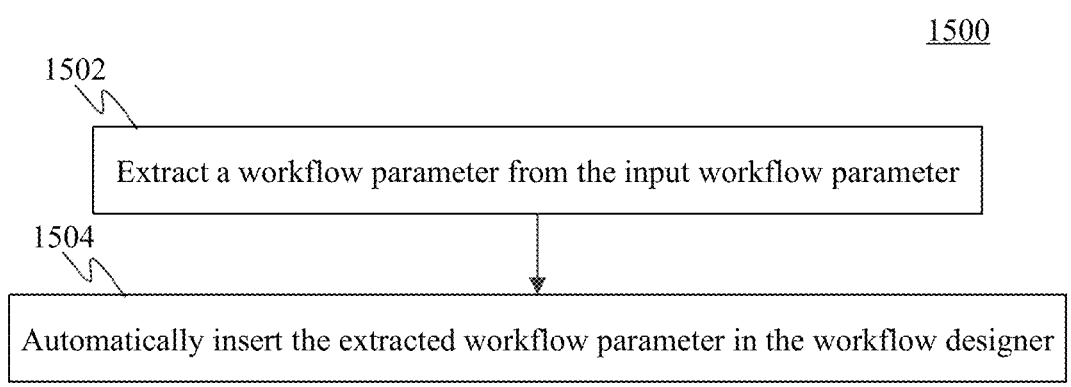
FIG. 15 shows a flowchart providing a process for automatically inputting an extracted parameter into a workflow designer, according to an example embodiment.

In embodiments, input correction system 142 may be configured to automatically populate a field of a workflow in development. For example, FIG. 15 shows a flowchart 1500 of a method for automatically inputting an extracted parameter into a workflow designer, according to an example embodiment. Flowchart 1500 may be implemented by parameter workflow parameter completer 1120, for instance. FIG. 15 is described with continued reference to FIG. 11. Other structural and operational implementations will be apparent to persons skilled in the relevant art(s) based on the following discussion regarding flowchart 1500 and system 1100 of FIG. 11.

Flowchart 1500 begins with step 1502. In step 1502, a workflow parameter is extracted from the input workflow parameter. For instance, with reference to FIG. 11, workflow parameter completer 1120 may obtain input workflow parameter 144 from parameter receiver 1102. Workflow parameter completer 1120 may analyze input workflow parameter 144 to determine whether one or more additional workflow parameters may be extracted. For instance, in the above non-limiting example where a user may design a workflow in which an action or workflow step is to create an item, such as a list (e.g., a Microsoft® SharePoint list) upon a certain triggering event, the user may input a URL in workflow designer GUI 116 corresponding to location of the list (e.g., a SharePoint URL). As an example, the user may input a SharePoint URL in the appropriate workflow step as "www.example.com/teams/user/lists/xlist" in workflow designer GUI 116. Upon inputting the SharePoint URL, parameter determination controller 1106, at design time, may direct one or more validation services to validate the input as discussed above. In accordance with step 1502 of flowchart 1500, workflow parameter completer 1120 may obtain the inputted URL and automatically identify the name of the list as "xlist" based on the information contained within the user inputted URL. It is understood that workflow parameter completer 1120 is not limited to extracting list names from an inputted URL, but may also extract any other workflow parameter relevant to a workflow in development based on input workflow parameter 144.

In step 1504, the extracted workflow parameter is automatically inserted in the workflow designer. For instance, with reference to FIG. 11, the workflow parameter 1144 extracted by workflow parameter completer 1120 may be automatically inserted in an appropriate field of a workflow in development in workflow designer 106. In implementations, the automatic insertion of workflow parameter 1144 may be carried out in a similar manner as described above with the automatic substitution of replacement workflow parameter 1138 in step 1208. For instance, continuing with the above non-limiting example, where extracted workflow parameter 1144 comprises a name of a list (e.g., "xlist"), workflow parameter completer 1120 may cause workflow designer 106 to automatically insert the name of the list in a "list name" field, or the like, of workflow designer 106. In example embodiments, workflow designer 106 may cause UI generator 110 to display the automatically population of extracted workflow parameter 1144 in workflow designer GUI 116 such that a user may view the change to the workflow in real-time or near real-time.

It is further noted that in some implementations, the workflow parameter extracted by workflow parameter completer 1120 may be validated by parameter validator 1104 in a similar manner as described herein. Thus, in implementations, workflow parameter completer 1120 and workflow parameter healer 1122 may automatically identify, automatically populate, and/or heal one or more other parameters relevant to the workflow based on the inputted URL during development of a workflow, thus increasing the efficiency at which a workflow may be developed while simultaneously decreasing the likelihood that the workflow fails to execute properly.

D. Example Embodiments for Determining Workflow Remediation Instructions

Figure 16:
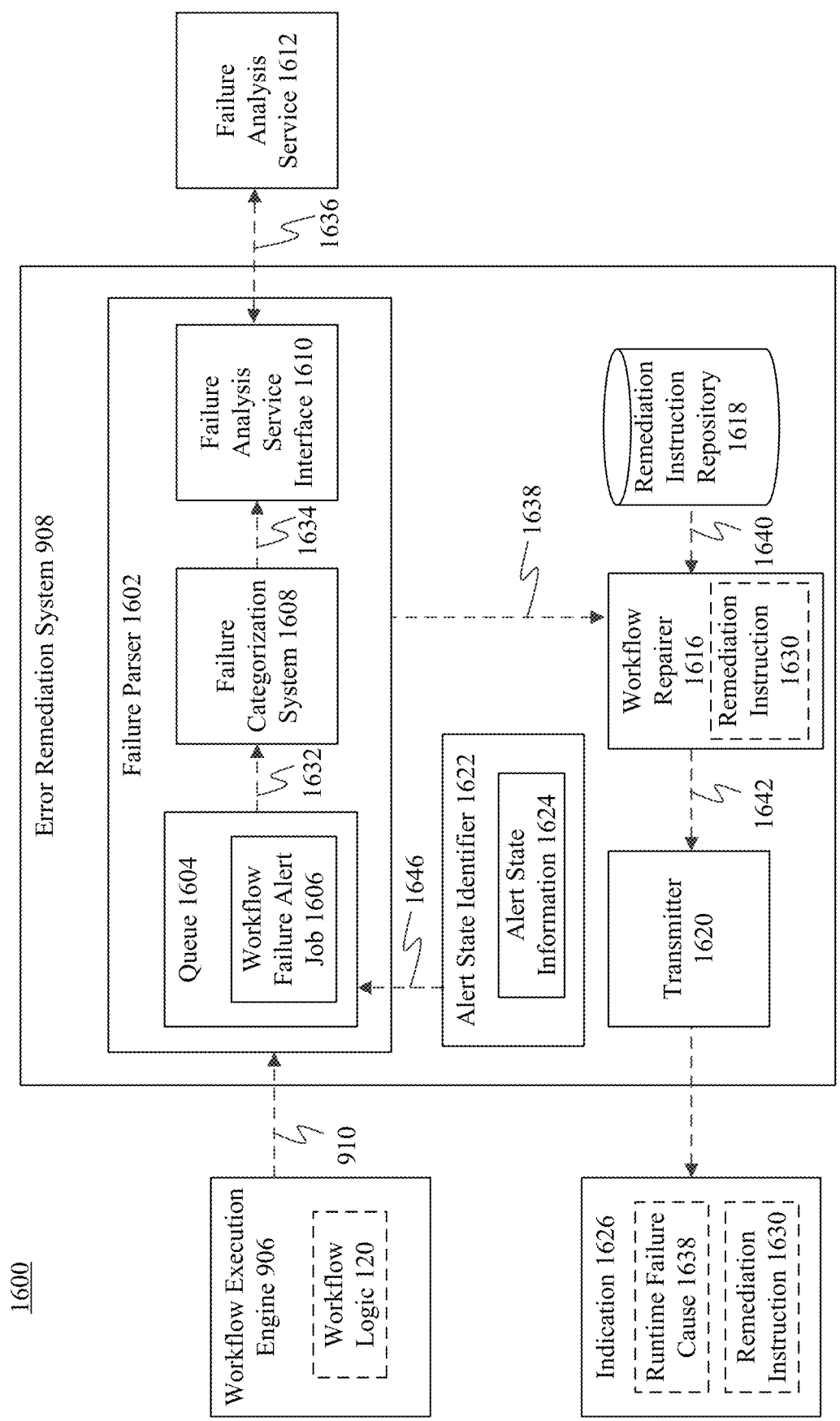
FIG. 16 shows a block diagram of an error remediation system configured to determine remediation instructions for a workflow runtime failure, according to an example embodiment.

FIG. 16 shows a block diagram of a system 1600 for determining remediation instructions for a workflow runtime failure, according to an example embodiment. As shown in FIG. 16, system 1600 includes a workflow execution engine 906, an error remediation system 908, and a failure analysis service 1612. Workflow execution engine 906 and error remediation system 908 may be implemented in computing device 102, server 134, or elsewhere, as described above with reference to FIG. 1. Error remediation system 908 includes a failure parser 1602, a workflow repairer 1616, a remediation instruction repository 1618, a transmitter 1620, and an alert state identifier 1622.

As shown in FIG. 16, failure parser includes a queue 1604, a failure categorization system 1608, and a failure analysis service interface 1610. Error remediation system 908 generates an indication 1626 that includes a runtime failure cause 1638 and a remediation instruction 1630. System 1600 is further described as follows.

Workflow execution engine 906 is configured to execute workflow logic 120 as described above. For instance, during execution of workflow logic 120, workflow execution engine 906 may execute one or more HTTP-based API calls corresponding to each workflow operation. During runtime, however, workflow logic 120 may fail to execute successfully due to one or more errors (e.g., an incorrect parameter value, an incorrect parameter type, etc.). In the event of such a runtime failure, workflow execution engine 906 may generate failure information 910 associated with the runtime failure of workflow logic 120. Failure information 910 may include HTTP status or error codes (e.g., a "400 Bad Request" status code, a "401 Unauthorized" status code, etc.) as appreciated by those skilled in the relevant art(s). Failure information is not limited to HTTP status or error codes, however, but may also encompass any other type of error or failure information associated with a runtime failure of workflow logic 120, such as an error message specific to the failed workflow as well as information relating to workflow logic 120 (e.g., workflow triggers, actions, input parameters, resources or connectors utilized by the workflow, etc.). Because certain error information of failure information 910 may be generated in a generic fashion (e.g., as an HTTP status code that is not specific to a particular workflow being executed), failure information 910 may not identity a deterministic cause of the workflow runtime failure. In accordance with implementations, error remediation system 908 may be configured to parse failure information 910 associated with a workflow runtime failure to identify such a cause of a runtime failure, and determine a remediation instruction for repairing the failed workflow (e.g., workflow logic 120).

For instance, failure parser 1602 may receive failure information 910 generated in response to a runtime failure of workflow logic 120. Failure parser 1602 may utilize any number of techniques to parse failure information 910 to identify a probable cause of the runtime failure. In one implementation, failure parser 1602 may rely on failure analysis service 1612 (e.g., a machine learning engine or a historical analysis service based on prior workflow failures, similar to those described in the prior subsection) to identify a probable cause of the runtime failure. For instance, based on failure information 910 and a response received from failure analysis service 1612, failure parser 1602 may determine that failure information 910 for a particular workflow runtime failure was generated as a result of a connection issue (e.g., a lack of a network connection).

In implementations, workflow repairer 1616 may obtain a runtime failure cause 1638 (e.g., the probable cause of the runtime failure) identified by failure parser 1602 to determine remediation instructions to remediate the runtime failure. For example, workflow repairer 1616 may determine one or more instructions that may be applied to correct workflow logic 120 to avoid recurrence of the runtime failure for subsequent executions.

As shown in FIG. 16, transmitter 1620 may obtain information 1642 comprising workflow remediation instruction 1630 determined by workflow repairer 1616 and runtime failure cause 1638. Transmitter 1620 may transmit runtime failure cause 1638 and the remediation instruction as indication 1626. Transmitter 1620 may transmit indication 1626 in any manner, including via a wired and/or wireless transmission, and may be transmitted over a local area network, a wide area network, or any other network (e.g., network 126 described with reference to FIG. 1). In example embodiments, indication 1626 may be transmitted as a message to a contact address associated with workflow logic 120. In one implementation, the message may comprise an e-mail message, a text message, a push notification, or other type of notification or alert to an address or device associated with a workflow, or may be provided directly via an interface associated with the workflow. In a non-limiting example, the contact address may include an address of a developer of the workflow for which failure information 910 was received, or any other contact address associated with the workflow (e.g., an end-user or an administrator).

In implementations, runtime failure cause 1638 included in indication 1626 may enable a user or developer understand a likely cause of the reason that workflow logic 120 failed to execute successfully. Furthermore, remediation instruction 1630 may include, for instance, one or more specific instructions that may be applied to the workflow to avoid recurrence of the runtime failure. In one example embodiment, indication 1626 may comprise a predetermined format and/or content, such as a template or form, in which runtime failure cause 1638 and/or remediation instruction 1630 may be inserted.

In another implementation, remediation instruction 1630 may comprise an interactive link configured to facilitate application of the repair instruction to the failed workflow. For example, an interactive link may be transmitted that, when activated, causes a user interface associated with the failed workflow to display a field corresponding to the remediation action. In one illustrative example, when the interactive link is activated (e.g., by clicking on the link with a pointing device, activating the link via a keyboard interaction, verbal interaction, touch interaction, etc.), the user interface may display a page, screen, field, etc. where a user interactive control relating to remediation instruction 1630 may be applied. In some other implementations, activation of the interactive link may cause a user interface to display a user interface element (e.g., a pointer, a pop-up notification, a highlight, etc.) identifying the field, page or section where remediation instruction 1630 may be applied.

In yet another implementation, upon activating an interactive link, a user interface associated with the workflow may be configured to automatically apply remediation instruction 1630 to the failed workflow (e.g., by replacing a parameter, changing a workflow step, etc.). For instance, the user interface associated with the workflow may display application of remediation instruction 1630, or may be configured to implement remediation instruction without causing the user interface to display the remediation instruction application. Accordingly, error remediation system 908 may facilitate the repair of a workflow that resulted in a failed execution in an efficient manner.

Although it is described herein that transmitter 1620 is configured to transmit an indication 1626 to a contact address associated with the workflow, techniques may also be implemented in which a remediation instruction is applied to the workflow that resulted in generation of failure information 910 without transmission of indication 1626. For instance, in some implementations, workflow repairer 1616 may be configured to automatically repair a failed workflow in response to determining an appropriate remediation instruction. Upon automatically repairing the workflow that resulted in generation of failure information 910, repaired workflow logic may be aromatically re-executed. In this manner, in the event of a workflow failure, the workflow that generated the failure information may be automatically repaired and re-executed without user intervention.

Figure 17:
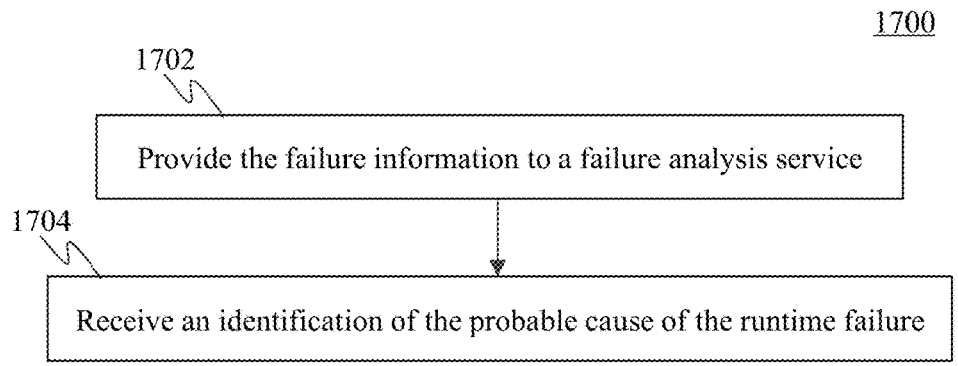
FIG. 17 shows a flowchart providing a process for determining an identification of a cause of the runtime failure from a service, according to an example embodiment.

In implementations, failure parser 1602 may determine a probable cause of a runtime failure in various ways. For example, FIG. 17 shows a flowchart 1700 of a method for receiving an identification of a cause of the runtime failure from a service, according to an example embodiment. In an implementation, the method of flowchart 1700 may be implemented by failure parser 1602. FIG. 17 is described with continued reference to FIG. 16. Other structural and operational implementations will be apparent to persons skilled in the relevant art(s) based on the following discussion regarding flowchart 1700 and system 1600 of FIG. 16.

Flowchart 1700 begins with step 1702. In step 1702, the failure information is provided to a failure analysis service. For instance, with reference to FIG. 16, queue 1604 of failure parser 1602 may be configured to queue a workflow failure alert job 1606 (in a queue of workflow failure alert jobs) for execution in response to receiving failure information 910. Upon execution of workflow failure alert job 1606, a request 1632 comprising failure information 910 is provided to failure categorization subsystem 1608. In example embodiments, failure categorization system 1608 is configured to determine, for instance, an appropriate technique for parsing failure information 910 to identify a probable cause of the runtime failure. In some implementations, failure categorization system 1608 may comprise a pattern matching algorithm for identifying a type or class of failure information 910 prior to determining a probable cause of the runtime failure.

Failure categorization system 1608 may direct, using signals 1634, an appropriate failure analysis service interface 1610 to provide a request 1636 comprising failure information 910 to a failure analysis service 1612 to identify a probable cause of the runtime failure. In implementations, failure analysis service 1612 may comprise one or more services, algorithms, and/or techniques for analyzing failure information 910. For example, failure analysis service 1612 may include a historical analysis service, a machine learning engine, and/or a manually generated failure analysis algorithm for parsing failure information 910. In implementations, a historical analysis service and/or machine learning algorithm may be implemented in a similar manner as described with reference to FIG. 11.

For instance, a historical analysis service may be configured to analyze historical information associating runtime failure information and causes of runtime to identify a probable cause of the runtime failure corresponding to failure information 910. In an example implementation, the historical analysis service may store information regarding each workflow executed by workflow engine 906, including but not limited to an indication of whether the workflow was executed successfully, parameters, connectors, resources, etc. utilized in the workflow, error information generated by workflow engine 906 during attempts to execute the workflow, etc. For instance, if failure information 910 is historically associated with a certain cause of a runtime failure (e.g., an expiration of a token), the historical analysis service may identify the same cause of runtime failure corresponding to failure information 910. In some other implementations, a historical analysis service may be implemented across different services or workflow platforms. For instance, failure information association associated with runtime failures for different services or workflow platforms may correlated with common causes of runtime failures. Based on such a historical analysis across different services and/or platforms, a historical analysis service may identify a cause of a runtime failure for a particular workflow. Failure analysis service 1612 may also comprise a machine learning engine configured to identify a probable cause of a runtime failure. For example, a machine learning engine may be trained based on prior failure information associated with workflow runtime failures, and be configured to output a probable cause of the runtime failure by analyzing failure information 910.

In accordance with implementations, failure analysis service 1612 may comprise a combination of services, algorithms, and/or techniques for identifying a probable cause of a runtime failure. Thus, although not shown in FIG. 16, failure categorization system 1608 may direct failure analysis service interface 1610 to interact with a plurality of failure analysis services 1612 (e.g., simultaneously, based on a prioritization, and/or based on the content or context of failure information 910). For instance, failure categorization system 1608 may choose to utilize a particular failure analysis service (or services) that is appropriate for a type or class of the workflow runtime error received by failure parser 1602. In some implementations, each type or class of runtime error may correspond to a different failure analysis service 1612, such that different error types corresponding runtime failures may be analyzed using one or more different techniques. In yet another implementation, if a particular failure analysis service 1612 fails to identify a cause of a runtime failure, failure categorization system 1608 may choose a different failure analysis service to attempt to identify a cause of the runtime failure. In other implementations, a plurality of failure analysis services may be utilized simultaneously, sequentially or otherwise, to identity a probable cause of the runtime failure.

It is also noted that although failure analysis service 1612 is illustrated as being separate from error remediation system 908 in FIG. 16, failure analysis service 1612 may be implemented local to error remediation system 908 (e.g., as part of failure parser 1602).

In step 1704, an identification of the probable cause of the runtime failure is received. For instance, with continued reference to FIG. 16, failure analysis service interface 1610 may be configured to receive an identification of the probable cause of the workflow runtime failure corresponding to failure information 910 from failure analysis service 1612 using one or more of the above described techniques. The probable cause of the runtime failure may comprise, for instance, an identification of an invalid input, an incorrect parameter type (e.g., a first name entered in an e-mail address field), an authentication or token error, a network connection error, etc. As described in greater detail below, failure parser 1602 may transmit runtime failure cause 1638 comprising the probable cause of the runtime failure to workflow repairer 1616 to determine appropriate remediation instruction to repair the failed workflow.

As an illustrative example, a developer may design a workflow in which an email is to be sent to a user-specified address each time an item is added to a list, such as a Microsoft® SharePoint list. If the developer inadvertently inputs an incorrect field into the e-mail address filed (e.g., a name instead of an e-mail address), workflow logic 120 may fail during execution due to a lack of a properly formatted e-mail address in the appropriate field. As a result, workflow engine 906 may generate an error code corresponding (e.g., a "400 Bad Request" HTTP status code) corresponding to the runtime failure. Failure parser 1602, using techniques described herein, may parse failure information 910 corresponding to the failed execution of workflow logic 120 to identify a probable cause of the runtime failure. For instance, in this illustrative example, failure parser 1602 may determine that the HTTP-based API request was not constructed properly based on the HTTP status code and determine that the failure information is related to an invalid input parameter. Based on this determination and other information associated with workflow logic 120 (e.g., the content of the workflow, the workflow action that resulted in the failure, the identity of any connectors, resources, or services used in the workflow, etc.), failure categorization system 1608 may identify an appropriate failure analysis service 1612 (or plurality of failure analysis services) to determine that the probable cause of the runtime failure of workflow logic 120 was an invalid e-mail address.

In another example, failed execution of workflow logic 120 may result in a "401 Unauthorized" status code. In this example, failure parser 1602, using techniques herein, may parse failure information 910 to determine that the status code relates to a communication error. As a result, failure categorization system 1608 may identify one or more failure analysis services 1612 to utilize in identifying a probable cause of the runtime failure (e.g., a connection in an erroneous state, an expired authorization, etc.). These implementations are not intended to be limiting, and may include parsing any other type of status or error code, and/or other information related to a workflow runtime failure to identify cause of the runtime failure.

Figure 18:
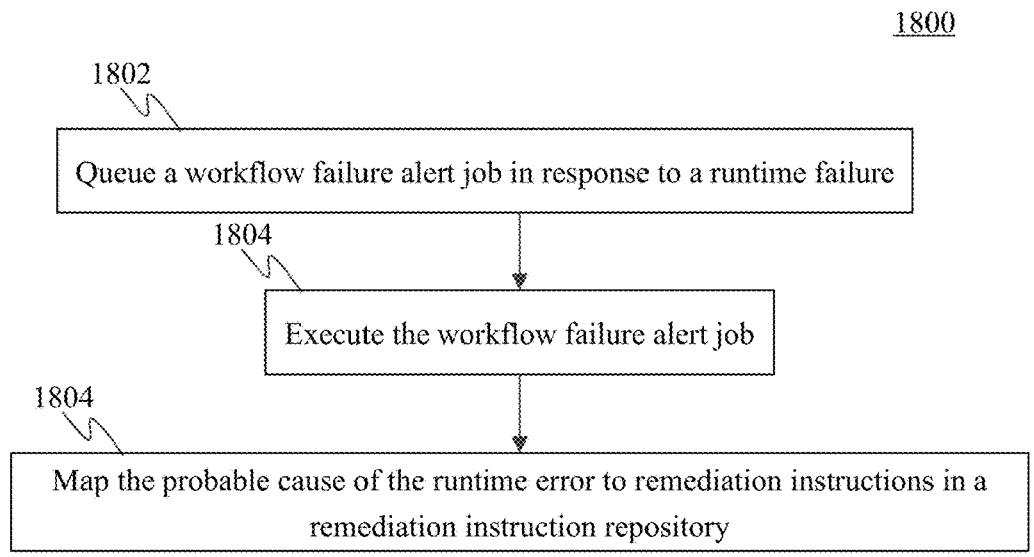
FIG. 18 shows a flowchart providing a process for queuing and executing a workflow failure job in response to a workflow runtime failure, according to an example embodiment.

In implementations, workflow failure alert job 1606 may be queued in queue 1604 in various ways. For example, FIG. 18 shows a flowchart 1800 of a method for queuing a workflow failure job in response to a workflow runtime failure, according to an example embodiment. Flowchart 1800 may be implemented by queue 1604 and workflow failure job alert 1606, for instance. FIG. 18 is described with continued reference to FIG. 16. Other structural and operational implementations will be apparent to persons skilled in the relevant art(s) based on the following discussion regarding flowchart 1800 and system 1600 of FIG. 16.

Flowchart 1800 begins with step 1802. In step 1802, in response to a workflow runtime failure, a workflow failure alert job is queued. For instance, with reference to FIG. 16, in an event where workflow logic 120 fails to execute successfully, workflow execution engine 906 provides failure information 910 corresponding to the runtime failure to failure parser 1602. In response to receiving failure information 910, queue 1604 may queue workflow failure alert job 1606 corresponding to the runtime failure. For example, queue 1604 may be configured to determine remediation instructions across a plurality of different users, groups, organizations, etc. Accordingly, queue 1604 may identify each workflow failure alert job 1606 for which remediation instructions are to be determined. Queue 1604 may process workflow failure alert jobs 1606 in a sequential fashion, or may process such jobs in a distributed manner (e.g., distributed across multiple nodes or servers).

In implementations, workflow failure job 1606 may be queued if remediation instructions associated with a failed workflow (e.g., workflow logic 120) are to be determined and provided to a contact address associated with the workflow. For instance, where an owner of the contact address has not subscribed to receiving remediation instructions, queue 1604 may not queue a workflow failure alert job 1606 upon a runtime failure of workflow logic. In other implementations, queue 1604 may not queue a workflow failure alert job 1606 corresponding to a workflow that is repetitively failing for the same reason. In another example, workflow failure alert job 1606 may be queued or executed based on another service (e.g., via an API, such as a RESTful API from a user interface associated with the workflow) and/or in response to a user interaction with an appropriate user interactive control of a workflow interface (e.g., via an API or other request to determine remediation instructions for a failed workflow). Other examples regarding the queuing of workflow failure alert job 1606 are described in greater detail with reference to FIG. 19.

In step 1804, the workflow failure alert job is executed. For instance, with reference to FIG. 16, failure parser 1602 may be configured to execute workflow failure alert job 1606. Execution of workflow failure alert job 1606 may trigger failure parser 1602 to identify a probable cause of the workflow runtime failure. In implementations, workflow failure alert job 1606 may further be configured to determine an error identifier based on failure information 910. For example, an error identifier may include a type or class of the workflow runtime failure corresponding to failure information 910 using a pattern matching algorithm or the like. Based on the determined error identifier, upon execution, workflow failure alert job 1606 may apply the error identifier to failure categorization system 1608 in a manner as described above to identify a probable cause of the workflow runtime failure.

For example, as described above with reference to step 1702 of FIG. 17, failure categorization system 1608 may utilize a particular failure analysis service (or services) that is appropriate for the error identifier (e.g., a type or class) associated with the workflow runtime error. For instance, if an error identifier associated with failure information 910 for a particular workflow runtime failure corresponded to an invalid input, failure categorization system 1608 may utilize a particular failure analysis service (e.g., or a particular technique or algorithm) to specifically identify the specific input parameter that caused the runtime error. In other words, failure categorization system 1608 may be configured to identify a probable cause of a workflow runtime failure based on any number of services (or algorithms, or techniques), each one being tailored to a particular error identifier. In this manner, because identification of a probable cause of a runtime failure may be conducted in a tailored manner, the identification may be carried out quickly and accurately.

In step 1806, the probable cause of the workflow runtime failure is mapped to remediation instructions in a remediation instruction repository. For instance, as shown in FIG. 16, workflow repairer 1616 may obtain runtime failure cause 1638 from failure parser 1602. Workflow repairer 1616 may be configured to map the probable cause of the runtime failure 1616 identify one or more remediation instructions. In implementations, workflow repairer 1616 may identify the remediation instructions by mapping the probable cause of the runtime failure to a remediation instruction in remediation instruction repository 1618. In example embodiments, remediation instruction repository 1618 may store a correlation (e.g., a mapping) between failure causes and remediation instructions that may be applied to repair a failed workflow. Remediation instruction repository 1618 may store such a mapping in any suitable data structure, such as a database, table, spreadsheet, etc. Although shown as being implemented as part of error remediation system 908, remediation instruction repository 1618 may be implemented in another device and/or be located remotely from error remediation system 908, such as on a cloud-based network.

In examples, remediation instruction repository 1618 may provide one or more repair steps that may be applied, either by a user or automatically, to repair the workflow that led to generation of workflow failure alert job 1606. In some example embodiments, remediation instruction repository

1618 may comprise, for each remediation instruction, a predefined form or template of an indication that may be transmitted to a contact address. For instance, the form or template may comprise one or more blank fields or placeholders which may become populated based on runtime failure cause 1638 prior to transmission to a contact address. In one illustrative example, runtime failure cause 1638 may identify one or more incorrect input parameters that caused workflow logic 120 to execute unsuccessfully. Workflow repairer 1616 may utilize the incorrect input parameters to populate a predefined form or template 1640 obtained from remediation instruction repository 1618 corresponding to particular runtime failure. In this manner, when indication 1626 is transmitted to a contact address, indication 1626 may identify runtime failure cause 1638, along with one or more specific and tailored remediation instructions in a format that an ordinary developer can easily understand and apply to repair the failed workflow.

Figure 19:
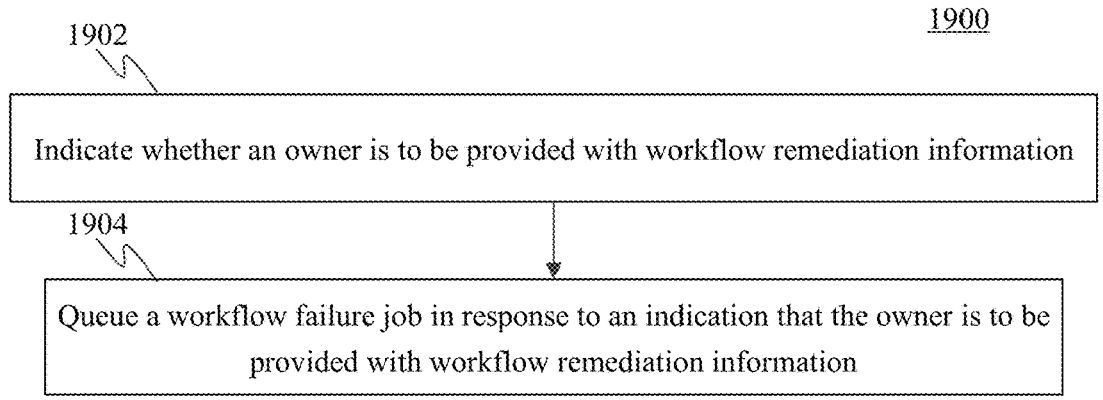
FIG. 19 shows a flowchart providing a process for queuing a workflow failure job in response to an indication that an owner is to be notified, according to an example embodiment.

As described above, workflow failure alert job 1606 may be queued in various ways. For example, FIG. 19 shows a flowchart 1900 of a method for queuing a workflow failure job in response to an indication that an owner is to be notified, according to an example embodiment. Flowchart 1900 may be implemented by queue 1604, workflow failure job alert 1606, and alert state identifier 1622, for example. FIG. 19 is described with continued reference to FIG. 16. Other structural and operational implementations will be apparent to persons skilled in the relevant art(s) based on the following discussion regarding flowchart 1900 and system 1600 of FIG. 16.

Flowchart 1900 begins with step 1902. In step 1902, an indication is made whether an owner is to be provided with workflow remediation information. For instance, with reference to FIG. 16, alert state identifier 1622 may be configured to determine whether an owner of a contact address associated with workflow logic 120 is to be notified of workflow remediation information in the event of a runtime failure and transmit an alert status indication 1646 indicating whether the owner should be notified. Alert state information 1624 may comprise a data structure such as a storage table (e.g., a database or the like) corresponding to each user and/or workflow with one or more indications, flags, or times identifying whether the owner of the contact address associated with the workflow should be notified. Alert state information 1624 may comprise any format or data structure, including a database, a spreadsheet, etc., and include any number of rows corresponding to workflows, contact address owners, etc. to track whether an owner is to be notified. For example, alert state identifier 1622 may be configured to not queue workflow failure alert job 1606 for each attempt of workflow execution engine 906 to execute a workflow based on any number of factors, including information stored in alert state information 1624.

In one example implementation, alert state identifier 1622 may be configured to queue workflow failure alert job 1606 based on a determination that an owner of the contact address associated with the workflow has subscribed to remediation information. An owner may enable or disable a remediation information subscription in a number of ways, such as through a user interactive toggle, button, selection, etc. via the user interface associated with the workflow. In one implementation, upon disabling or enabling a user subscription to workflow remediation information, information within alert state information 1624 corresponding to the owner or workflow (e.g., a particular row in a table) may be added, deleted, or modified based on the subscription information. Accordingly, if an owner has not subscribed to receiving workflow remediation information, workflow failure alert job 1606 corresponding to one or more workflows associated with the user need not be queued, thereby preserving resources of the system on which error remediation system 908 is executed (e.g., server 134).

In another example implementation, alert state information 1624 may indicate whether an alteration has been made to a particular workflow logic in response to a previously transmitted remediation instruction to repair the workflow. For instance, if a workflow has failed on a past occasion, it can be inferred that the same unmodified workflow is likely to fail again for the same reason. As a result, error remediation system 908 need not utilize resources to repeat a remediation analysis that is unlikely to output a different cause of a runtime failure or remediation instruction. As an example, transmitter 1620 may have provided indication 1626 to a contact address associated with a particular workflow to repair a workflow runtime failure on a past occasion. If a user or developer has not altered the workflow in response to the remediation instruction contained within indication 1626 to repair the workflow, alert state information 1624 may indicate (e.g., using a flag or the like) that the previously failed workflow has not been altered. Conversely, if a user or developer has altered the workflow, alert state information 1624 may indicate that the workflow has been altered in response to a previously transmitted indication 1624. In some example implementations, alert state information 1624 may indicate whether an alteration made to a workflow is related to the previously transmitted remediation instruction. For instance, if an alteration is unrelated to the remediation instruction, it may be inferred that the workflow is likely to fail for the same reason, and alert state identifier 1622 may prevent queuing workflow failure alert job 1606 as a result.

In yet another example implementation, alert state information 1624 may store a time having elapsed since the first or last runtime failure. For instance, a workflow failure alert job 1606 may not be queued for workflows in which a threshold time has elapsed since the first runtime failure (e.g., where a user or developer has not fixed a previously failed workflow). In another implementation, workflow failure alert job 1606 may not be queued if a workflow failure alert job corresponding to the same failed workflow has been queued and/or executed recently. Alert state information 1624 may store a time in any suitable manner, including based on a timer, an actual date/time, and/or a flag indicating whether a threshold time has elapsed).

In step 1904, a workflow failure job is queued in response to an indication that the owner is to be provided with workflow remediation information. For instance, with reference to FIG. 16, failure parser 1602 may be configured to queue workflow failure alert job 1606 corresponding to a runtime failure of workflow logic 120 in response to alert state identifier 1622 indicating that an owner is to be provided with remediation information associated with the runtime failure. Once workflow failure alert job 1606 is queued, it may be executed in a similar manner as described above.

As an illustrative example, when workflow failure alert job 1606 executes, an entry (e.g., a row in a storage table) in alert state information 1624 corresponding to the failed workflow may be created indicating whether indication 1626 has been provided to an owner of the contact address associated with the failed workflow and a time corresponding to the workflow failure alert job 1606. If a subsequent workflow runtime error is generated for the same workflow, failure parser 1602 may determine whether to queue a new workflow failure alert job for the workflow based on alert state identifier 1622. In this example, alert state identifier 1622 may reference alert state information 1624 to determine whether the owner has already been alerted with remediation instructions, whether an alteration has been made, whether a time has elapsed since a prior workflow failure alert job was executed, and/or whether a threshold number of workflow failures have been exceeded. If alert state identifier 1622 determines, based on alert state information 1624, that an owner should be notified, failure parser 1602 may queue workflow failure alert job 1606 corresponding to the runtime failure of workflow logic 120. In this manner, failure parser 1602 may preserve resources by queuing workflow failure alert jobs only where appropriate, rather than for each runtime failure generated by workflow engine 906.

In yet another implementation, alert state information 1624 may indicate a number of failed workflow executions for a particular flow or a flag indicating whether a threshold number of failed executions have been exceeded. In an illustrative example, if workflow logic 120 relies on a resource (e.g., a Microsoft® SharePoint list) during execution, and a user has deleted the resource or modified the content of the resource in a manner that hinders the execution of the workflow, executions of workflow logic 120 are expected to repeatedly fail. As a result, alert state identifier 1622 may indicate whether a threshold number of failed executions have exceeded for the workflow based on alert state information 1624, and prevent workflow failure alert job 1606 from being queued appropriately. In some examples, the threshold number of failed executions may be predetermined, or may be specified by a user or developer (e.g., via the user interface associated with the workflow or via workflow designer GUI 116).

In other example embodiments, alert state information 1624 may comprise a flag, or the like, corresponding to a user alert state that is based on any one or more of the foregoing factors (e.g., a user subscription status, an alteration status, a time regarding the first or last runtime failure, a number of failed executions, or any other factor). For instance, alert state information 1624 may be configured to store a user alert state flag, based on a combination of the foregoing factors, indicating whether an owner of the contact address associated with the workflow is to be notified in the event of a runtime failure.

In one illustrative example, if a particular user has subscribed to workflow remediation information for a workflow, the flag may indicate that user is to be notified. If, for instance, the workflow is repeatedly failing for the same reason as discussed earlier, the user alert state flag corresponding to an entry in a table may be changed to indicate that the user is not to be notified. In a further illustration, if a user subsequently applies one or more remediation instructions to repair the workflow, the user alert state flag may be reset (e.g., to indicate that the user is to be notified) for a subsequent workflow execution. These examples are illustrative only, and are not intended to limit the scope of the manner in which alert state identifier 1622 may determine whether a user is to be notified in the event of a workflow runtime failure.

III. Example Mobile and Stationary Device Embodiments

Computing device 102, workflow designer 106, UI generator 110, workflow logic generator 112, local application 122, input correction system 142, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, error remediation system 908, parameter receiver 1102, parameter validator 1104, parameter determination controller 1106, service provider interface 1108, machine learning interface 1112, historical analysis interface 1116, workflow parameter completer 1102, workflow parameter healer 1122, service provider 1110, machine learning engine 1114, historical analysis service 1118, failure parser 1602, failure categorization system 1608, failure analysis service interface 1610, alert state identifier 1622, workflow repairer 1616, failure analysis service 1612, indication 1626, flowchart 200, flowchart 1000, flowchart 1200, flowchart 1300, flowchart 1400, flowchart 1500, flowchart 1700, flowchart 1800, and/or flowchart 1900 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of workflow designer 106, UI generator 110, workflow logic generator 112, local application 122, input correction system 142, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, error remediation system 908, parameter receiver 1102, parameter validator 1104, parameter determination controller 1106, service provider interface 1108, machine learning interface 1112, historical analysis interface 1116, workflow parameter completer 1102, workflow parameter healer 1122, service provider 1110, machine learning engine 1114, historical analysis service 1118, failure parser 1602, failure categorization system 1608, failure analysis service interface 1610, alert state identifier 1622, workflow repairer 1616, failure analysis service 1612, indication 1626, flowchart 200, flowchart 1000, flowchart 1200, flowchart 1300, flowchart 1400, flowchart 1500, flowchart 1700, flowchart 1800, and/or flowchart 1900 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 20:
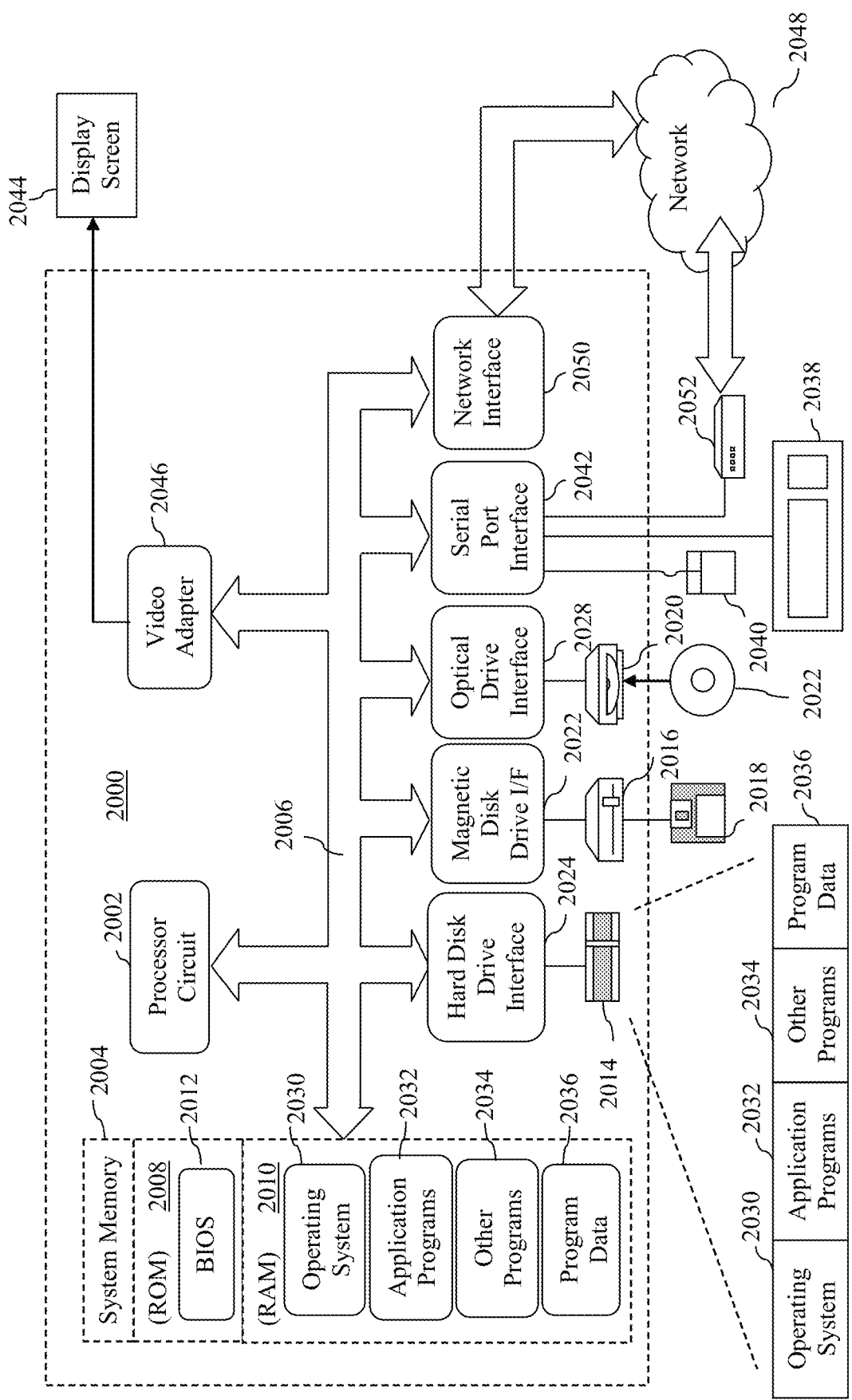
FIG. 20 shows a block diagram of an example computing device that may be used to implement embodiments.

FIG. 20 depicts an exemplary implementation of a computing device 2000 in which embodiments may be implemented. For example, any of computing device 102, and server 134 may be implemented in one or more computing devices similar to computing device 2000 in stationary or mobile computer embodiments, including one or more features of computing device 2000 and/or alternative features. The description of computing device 2000 provided herein is provided for purposes of illustration, and is not intended to be limiting. Embodiments may be implemented in further types of computer systems, as would be known to persons skilled in the relevant art(s).

As shown in FIG. 20, computing device 2000 includes one or more processors, referred to as processor circuit 2002, a system memory 2004, and a bus 2006 that couples various system components including system memory 2004 to processor circuit 2002. Processor circuit 2002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2002 may execute program code stored in a computer readable medium, such as program code of operating system 2030, application programs 2032, other programs 2034, etc. Bus 2006 represents one or more of any of several types of bus structures, including a memory bus or memory controller, a peripheral bus, an accelerated graphics port, and a processor or local bus using any of a variety of bus architectures. System memory 2004 includes read only memory (ROM) 2008 and random access memory (RAM) 2010. A basic input/output system 2012 (BIOS) is stored in ROM 2008.

Computing device 2000 also has one or more of the following drives: a hard disk drive 2014 for reading from and writing to a hard disk, a magnetic disk drive 2016 for reading from or writing to a removable magnetic disk 2018, and an optical disk drive 2020 for reading from or writing to a removable optical disk 2022 such as a CD ROM, DVD ROM, or other optical media. Hard disk drive 2014, magnetic disk drive 2016, and optical disk drive 2020 are connected to bus 2006 by a hard disk drive interface 2024, a magnetic disk drive interface 2026, and an optical drive interface 2028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 2030, one or more application programs 2032, other programs 2034, and program data 2036. Application programs 2032 or other programs 2034 may include, for example, computer program logic (e.g., computer program code or instructions) for implementing workflow designer 106, UI generator 110, workflow logic generator 112, local application 122, input correction system 142, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, error remediation system 908, parameter receiver 1102, parameter validator 1104, parameter determination controller 1106, service provider interface 1108, machine learning interface 1112, historical analysis interface 1116, workflow parameter completer 1102, workflow parameter healer 1122, service provider 1110, machine learning engine 1114, historical analysis service 1118, failure parser 1602, failure categorization system 1608, failure analysis service interface 1610, alert state identifier 1622, workflow repairer 1616, failure analysis service 1612, indication 1626, flowchart 200, flowchart 1000, flowchart 1200, flowchart 1300, flowchart 1400, flowchart 1500, flowchart 1700, flowchart 1800, and/or flowchart 1900 (including any suitable step of flowcharts 200, 1000, 1200, 1300, 1400, 1500, 1700, 1800, or 1900), and/or further embodiments described herein.

A user may enter commands and information into the computing device 2000 through input devices such as keyboard 2038 and pointing device 2040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 2002 through a serial port interface 2042 that is coupled to bus 2006, but may be connected by other interfaces, such as a parallel port, game port, or a universal serial bus (USB).

A display screen 2044 is also connected to bus 2006 via an interface, such as a video adapter 2046. Display screen 2044 may be external to, or incorporated in computing device 2000. Display screen 2044 may display information, as well as being a user interface for receiving user commands and/or other information (e.g., by touch, finger gestures, virtual keyboard, etc.). In addition to display screen 2044, computing device 2000 may include other peripheral output devices (not shown) such as speakers and printers.

Computing device 2000 is connected to a network 2048 (e.g., the Internet) through an adaptor or network interface 2050, a modem 2052, or other means for establishing communications over the network. Modem 2052, which may be internal or external, may be connected to bus 2006 via serial port interface 2042, as shown in FIG. 20, or may be connected to bus 2006 using another interface type, including a parallel interface.

As used herein, the terms "computer program medium," "computer-readable medium," and "computer-readable storage medium" are used to refer to physical hardware media such as the hard disk associated with hard disk drive 2014, removable magnetic disk 2018, removable optical disk 2022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 2032 and other programs 2034) may be stored on the hard disk, magnetic disk, optical disk, ROM, RAM, or other hardware storage medium. Such computer programs may also be received via network interface 2050, serial port interface 2042, or any other interface type. Such computer programs, when executed or loaded by an application, enable computing device 2000 to implement features of embodiments discussed herein. Accordingly, such computer programs represent controllers of the computing device 2000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for correcting an input workflow parameter in a workflow designer is disclosed herein. The system includes: a processor circuit; and a memory that stores program code configured to be executed by the processor circuit, the program code comprising: a parameter receiver configured to receive an input workflow parameter input to a user interface control of a workflow in development in the workflow designer; a parameter validator configured to determine whether the input workflow parameter is an invalid input to the workflow; and a workflow parameter healer configured to, in response to the parameter validator determining that the input workflow parameter is an invalid input to the workflow: obtain a replacement workflow parameter; and automatically substitute the input workflow parameter with the replacement workflow parameter in the user interface control during a development time of the workflow.

In one implementation of the foregoing system, the parameter validator comprises: a service provider interface configured to: provide to a service provider a request that includes the input workflow parameter for validation, the service provider associated with a workflow step having the user interface control in which the input workflow parameter was received; and receive from the service provider a response that includes the replacement workflow parameter.

In another implementation of the foregoing system, the parameter validator comprises: a machine learning interface configured to: provide to a machine learning engine a request that includes the input workflow parameter for validation; and receive from the machine learning engine a response that includes the replacement workflow parameter.

In another implementation of the foregoing system, the parameter validator comprises: a historical analysis interface configured to: provide to a historical analysis service a request that includes the input workflow parameter for validation; and receive from the historical analysis service a response that includes the replacement workflow parameter.

In another implementation of the foregoing system, the parameter validator is configured to: direct a service provider interface to provide to a service provider a first request that includes the input workflow parameter for validation, the service provider associated with a workflow step having the user interface control in which the input workflow parameter was received, and in response to an indication of a failure of the service provider to validate the input workflow parameter, direct a machine learning interface to provide to a machine learning engine a second request that includes the input workflow parameter for validation, the machine learning interface configured to receive a response to the second request from the machine learning engine that includes the replacement workflow parameter.

In another implementation of the foregoing system, the parameter validator is configured to: direct a service provider interface to provide to a service provider a first request that includes the input workflow parameter for validation, the service provider associated with a workflow step having the user interface control in which the input workflow parameter was received, and in response to an indication of a failure of the service provider to validate the input workflow parameter, direct a historical analysis interface to provide to a historical analysis service a second request that includes the input workflow parameter for validation, the historical analysis interface configured to receive a response to the second request from the historical analysis service that includes the replacement workflow parameter.

In another implementation of the foregoing system, the system, further comprises: a workflow parameter completer configured to: extract a workflow parameter from the input workflow parameter; and automatically insert the extracted workflow parameter in the workflow designer during the development time of the workflow.

A method in a computing device for correcting an input workflow parameter in a workflow designer is disclosed herein. The method includes: receiving an input workflow parameter input to a user interface control of a workflow in development in the workflow designer; determining whether the input workflow parameter is an invalid input to the workflow; and in response to a determination that that the input workflow parameter is an invalid input to the workflow: obtaining a replacement workflow parameter; and automatically substituting the input workflow parameter with the replacement workflow parameter in the user interface control during a development time of the workflow.

In one implementation of the foregoing method, the determining comprises: providing to a service provider a request that includes the input workflow parameter for validation, the service provider associated with a workflow step having the user interface control in which the input workflow parameter was received; and receiving from the service provider a response that includes the replacement workflow parameter.

In another implementation of the foregoing method, the determining comprises: providing to a machine learning engine a request that includes the input workflow parameter for validation; and receiving from the machine learning engine a response that includes the replacement workflow parameter.

In another implementation of the foregoing method, the determining comprises: providing to a historical analysis service a request that includes the input workflow parameter for validation; and receiving from the historical analysis service a response that includes the replacement workflow parameter.

In another implementation of the foregoing method, the determining comprises: providing to a service provider a first request that includes the input workflow parameter for validation, the service provider associated with a workflow step having the user interface control in which the input workflow parameter was received, and in response to an indication of a failure of the service provider to validate the input workflow parameter: providing to a machine learning engine a second request that includes the input workflow parameter for validation; and receiving a response to the second request from the machine learning engine that includes the replacement workflow parameter.

In another implementation of the foregoing method, the determining comprises: providing to a service provider a first request that includes the input workflow parameter for validation, the service provider associated with a workflow step having the user interface control in which the input workflow parameter was received, and in response to an indication of a failure of the service provider to validate the input workflow parameter: providing to a historical analysis service a second request that includes the input workflow parameter for validation; and receiving a response to the second request from the historical analysis service that includes the replacement workflow parameter.

In another implementation of the foregoing method, the method further comprises: extracting a workflow parameter from the input workflow parameter; and automatically inserting the extracted workflow parameter in the workflow designer during the development time of the workflow.

A system for determining workflow remediation instructions is disclosed herein. The system comprises: a processor circuit; and a memory that stores program code configured to be executed by the processor circuit, the program code comprising: a failure parser configured to: receive failure information generated in response to a runtime failure of workflow logic of a workflow; and analyze the failure information to identify a probable cause of the runtime failure; a workflow repairer configured to determine remediation instructions to remediate the probable cause of the runtime failure; and a transmitter configured to transmit an indication of the probable cause of the runtime failure and the remediation instructions to a contact address associated with the workflow.

In one implementation of the foregoing system, the failure parser is configured to: provide the failure information to a failure analysis service; and receive from the failure analysis service an identification of the probable cause of the runtime failure.

In another implementation of the foregoing system, the transmitter is configured to: provide an interactive link that, when activated, causes a user interface associated with the workflow to display a field corresponding to the remediation action.

In another implementation of the foregoing system, the failure parser is configured to: queue a workflow failure alert job in response to the runtime failure of the workflow logic; and execute the workflow failure alert job, the workflow failure alert job configured to: determine an error identifier based on the failure information, and apply the error identifier to a failure categorization system to identify the probable cause of the runtime failure; and the workflow repairer is configured to: map the probable cause of the runtime failure to the remediation instructions in a remediation instruction repository.

In another implementation of the foregoing system, the system further comprises: an alert state identifier configured to indicate whether an owner of the contact address is to be provided with workflow remediation information; and wherein the failure parser is configured to queue a workflow failure alert job in response to an indication that the owner is to be provided with workflow remediation information.

In another implementation of the foregoing system, the alert state identifier is based on user alert state information stored in an entry of a storage table.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for correcting an input workflow parameter in a workflow designer, comprising:
   receiving, by a computing device, an input workflow parameter input to a text input field of a workflow in development in the workflow designer, the workflow in development comprising a workflow step that identifies the input workflow parameter as an input to the workflow step;
   providing, by the computing device, a request to a parameter validation service to validate the input workflow parameter;
   determining, by the computing device whether the input workflow parameter is an invalid input to the workflow at a development time of the workflow prior to the execution thereof based at least on a response from the parameter validation service, the invalid input comprising a parameter containing at least one of a typographical error or an improper format that would cause an execution error of the workflow at runtime;
   in response to a determination that that the input workflow parameter is an invalid input to the workflow:
      obtaining a replacement workflow parameter that corrects the at least one of the typographical error or the improper format, and
      automatically substituting the input workflow parameter with the replacement workflow parameter in the text input field of the workflow step during the development time of the workflow; and
      generating executable workflow logic that includes the workflow step.

2. The method of claim 1, wherein said determining the input workflow parameter comprises:
   providing to a service provider a request that includes the input workflow parameter for validation, the service provider associated with the workflow step having the text input field in which the input workflow parameter was received; and
   receiving from the service provider a response that includes the replacement workflow parameter.

3. The method of claim 1, wherein said determining the input workflow parameter comprises:
   providing to a machine learning engine a request that includes the input workflow parameter for validation; and
   receiving from the machine learning engine a response that includes the replacement workflow parameter.

4. The method of claim 1, wherein said determining the input workflow parameter comprises:
   providing to a historical analysis service a request that includes the input workflow parameter for validation; and
   receiving from the historical analysis service a response that includes the replacement workflow parameter.

5. The method of claim 1, wherein said determining the input workflow parameter comprises:
   providing to a service provider a first request that includes the input workflow parameter for validation, the service provider associated with the workflow step having the text input field in which the input workflow parameter was received, and
   in response to an indication of a failure of the service provider to validate the input workflow parameter:

providing to a machine learning engine a second request that includes the input workflow parameter for validation; and receiving a response to the second request from the machine learning engine that includes the replacement workflow parameter.

6. The method of claim 1, wherein said determining the input workflow parameter comprises:

providing to a service provider a first request that includes the input workflow parameter for validation, the service provider associated with the workflow step having the text input field in which the input workflow parameter was received, and in response to an indication of a failure of the service provider to validate the input workflow parameter:

providing to a historical analysis service a second request that includes the input workflow parameter for validation; and receiving a response to the second request from the historical analysis service that includes the replacement workflow parameter.

7. The method of claim 1, further comprising:

extracting a workflow parameter from the input workflow parameter; and automatically inserting the extracted workflow parameter in the workflow designer during the development time of the workflow.

8. A system for correcting an input workflow parameter in a workflow designer, comprising:

a processor circuit; and a memory that stores program code, the program code configured to be executed by the processor circuit, the program code comprising:

a parameter receiver configured to receive an input workflow parameter input to a text input field of a workflow in development in the workflow designer, the workflow in development comprising a workflow step that identifies the input workflow parameter as an input to the workflow step;

a parameter validator configured to:

provide a request to a parameter validation service to validate the input workflow parameter, and determine whether the input workflow parameter is an invalid input to the workflow at a development time of the workflow prior to execution thereof based at least on a response from the parameter validation service, the invalid input comprising a parameter containing at least one of a typographical error or an improper format that would cause an execution error of the workflow at runtime;

a workflow parameter healer configured to, in response to the parameter validator determining that the input workflow parameter is an invalid input to the workflow:

obtain a replacement workflow parameter that corrects the at least one of the typographical error or the improper format, and automatically substitute the input workflow parameter with the replacement workflow parameter in the text input field of the workflow step during the development time of the workflow; and a workflow logic generator configured to generate executable workflow logic that includes the workflow step.

9. The system of claim 8, wherein the parameter validator comprises:

a service provider interface configured to:

provide to a service provider a request that includes the input workflow parameter for validation, the service provider associated with the workflow step having the text input field in which the input workflow parameter was received; and receive from the service provider a response that includes the replacement workflow parameter.

10. The system of claim 8, wherein the parameter validator comprises:

a machine learning interface configured to:

provide to a machine learning engine a request that includes the input workflow parameter for validation; and receive from the machine learning engine a response that includes the replacement workflow parameter.

11. The system of claim 8, wherein the parameter validator comprises:

a historical analysis interface configured to:

provide to a historical analysis service a request that includes the input workflow parameter for validation; and receive from the historical analysis service a response that includes the replacement workflow parameter.

12. The system of claim 8, wherein the parameter validator is configured to:

direct a service provider interface to provide to a service provider a first request that includes the input workflow parameter for validation, the service provider associated with the workflow step having the text input field in which the input workflow parameter was received, and in response to an indication of a failure of the service provider to validate the input workflow parameter, direct a machine learning interface to provide to a machine learning engine a second request that includes the input workflow parameter for validation, the machine learning interface configured to receive a response to the second request from the machine learning engine that includes the replacement workflow parameter.

13. The system of claim 8, wherein the parameter validator is configured to:

direct a service provider interface to provide to a service provider a first request that includes the input workflow parameter for validation, the service provider associated with the workflow step having the text input field in which the input workflow parameter was received, and in response to an indication of a failure of the service provider to validate the input workflow parameter, direct a historical analysis interface to provide to a historical analysis service a second request that includes the input workflow parameter for validation, the historical analysis interface configured to receive a response to the second request from the historical analysis service that includes the replacement workflow parameter.

14. The system of claim 8, further comprising:

a workflow parameter completer configured to:

extract a workflow parameter from the input workflow parameter; and automatically insert the extracted workflow parameter in the workflow designer during the development time of the workflow.

15. A computer-readable memory having computer program code recorded thereon that when executed by at least one processor causes the at least one processor to perform a method comprising:

receiving, by a computing device, an input workflow parameter input to a text input field of a workflow in development in the workflow designer, the workflow in development comprising a workflow step that identifies the input workflow parameter as an input to the workflow step;

providing a request to a parameter validation service to validate the input workflow parameter;

determining, by the computing device whether the input workflow parameter is an invalid input to the workflow at a development time of the workflow prior to the execution thereof based at least on a response from the parameter validation service, the invalid input comprising a parameter containing at least one of a typographical error or an improper format that would cause an execution error of the workflow at runtime;

in response to a determination that that the input workflow parameter is an invalid input to the workflow:

obtaining a replacement workflow parameter that corrects the at least one of the typographical error or the improper format, and automatically substituting the input workflow parameter with the replacement workflow parameter in the text input field of the workflow step during the development time of the workflow; and generating executable workflow logic that includes the workflow step.

16. The computer-readable memory of claim 15, wherein said determining the input workflow parameter comprises:

providing to a service provider a request that includes the input workflow parameter for validation, the service provider associated with the workflow step having the text input field in which the input workflow parameter was received; and receiving from the service provider a response that includes the replacement workflow parameter.

17. The computer-readable memory of claim 15, wherein said determining the input workflow parameter comprises:

providing to a machine learning engine a request that includes the input workflow parameter for validation; and receiving from the machine learning engine a response that includes the replacement workflow parameter.

18. The computer-readable memory of claim 15, wherein said determining the input workflow parameter comprises:

providing to a historical analysis service a request that includes the input workflow parameter for validation; and receiving from the historical analysis service a response that includes the replacement workflow parameter.

19. The computer-readable memory of claim 15, wherein said determining the input workflow parameter comprises:

providing to a service provider a first request that includes the input workflow parameter for validation, the service provider associated with the workflow step having the text input field in which the input workflow parameter was received, and in response to an indication of a failure of the service provider to validate the input workflow parameter:

providing to a machine learning engine a second request that includes the input workflow parameter for validation; and receiving a response to the second request from the machine learning engine that includes the replacement workflow parameter.

20. The computer-readable memory of claim 15, wherein said determining the input workflow parameter comprises:

providing to a service provider a first request that includes the input workflow parameter for validation, the service provider associated with the workflow step having the text input field in which the input workflow parameter was received, and in response to an indication of a failure of the service provider to validate the input workflow parameter:

providing to a historical analysis service a second request that includes the input workflow parameter for validation; and receiving a response to the second request from the historical analysis service that includes the replacement workflow parameter.

* * * * *